United States Patent
Tanaka

(10) Patent No.: US 8,068,729 B2
(45) Date of Patent: Nov. 29, 2011

(54) NETWORK TESTING APPARATUS, NETWORK TESTING METHOD AND RECORDING MEDIUM THEREOF

(75) Inventor: Atsushi Tanaka, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 856 days.

(21) Appl. No.: 12/068,230

(22) Filed: Feb. 4, 2008

(65) Prior Publication Data

US 2008/0187310 A1   Aug. 7, 2008

(30) Foreign Application Priority Data

Feb. 5, 2007 (JP) ................................ 2007-026105

(51) Int. Cl.
*H04B 10/08* (2006.01)
*H04B 17/00* (2006.01)
(52) U.S. Cl. ................... 398/16; 398/9; 398/25
(58) Field of Classification Search .............. 398/9, 16, 398/25; 370/241
See application file for complete search history.

(56) References Cited

U.S. PATENT DOCUMENTS

| | | | | |
|---|---|---|---|---|
| 6,397,359 B1* | 5/2002 | Chandra et al. | ............... | 714/712 |
| 7,054,356 B2* | 5/2006 | Wahl | .............................. | 375/219 |
| 2007/0073508 A1* | 3/2007 | Taniguchi et al. | ............ | 702/122 |
| 2007/0140689 A1* | 6/2007 | Haran | ............................. | 398/27 |

FOREIGN PATENT DOCUMENTS

JP   2005-20420   1/2005

* cited by examiner

*Primary Examiner* — Nathan Curs
(74) *Attorney, Agent, or Firm* — Staas & Halsey LLP

(57) ABSTRACT

This G-PON network testing apparatus composes a network by connecting between an OLT, ONU or ONT by a optical fiber. This testing apparatus stores testing items and code numbers in a storing section by correlating them from each other. It obtains data receiving time and transmits the data to a delay buffer A when no test is implemented and generates testing data in which a code number is added to the data when a test is implemented. Then, this testing apparatus extracts the code number from the generated testing data to implement the testing item and obtains time when the testing item is finished. Then, it calculates a test time necessary for implementing the test from this time and the data receiving time and reads the data transmitted to the delay buffer A after an elapsed of the calculated test time.

10 Claims, 15 Drawing Sheets

| CODE NUMBER | CONTENT OF TESTING |
|---|---|
| 01 | DELAYED INSERTION OF INPUT DATA |
| 02 | FLUCTUATION OF DATA ARRIVAL TIME |
| 03 | FALL OF PART OR ALL TRANSMISSION DATA |
| ... | ... |

Fig. 3

NETWORK TESTING APPARATUS, NETWORK TESTING METHOD AND RECORDING MEDIUM THEREOF

BACKGROUND OF THE INVENTION

1. Field of the Invention

The present invention relates to a network testing apparatus, a network testing method and a recording medium storing a network testing program for testing events occurring within a network installed between an OLT or an ONT and an ONU or the ONT and constructed by connecting one optical fiber between the OLT or the ONT and the ONU or the ONT.

2. Description of the Related Art

Hitherto, as one of technologies for realizing FTTH (Fiber To The Home) for transmitting optical signals transmitted from an accommodating station such as a common carrier to a plurality of subscriber's homes, PON (Passive Optical Network) for transmitting signals to the plurality of homes by splitting one optical fiber by a splitting device such as a splitter has been used. In the PON, an OLT (Optical Line Terminal) within the accommodating station and a plurality of ONU/ONT (Optical Network Unit/Optical Network Termination) are configured in a model of point-to-multi-points.

Lately, G-PON (Gigabit-passive Optical Networks) standardized by the ITU-T: Telecommunication-Standardization Sector, International Telecommunication Union) and that realizes a transmission speed of gigabits (Gbps) has come to be used. Because a transmission frame of the G-PON is set to be a fixed length frame of period of 125 microseconds that is the same period with a basic time unit of the conventional telecommunication services, it enables one to efficiently use existing services such as telephone and dedicated lines. For example, the G-PON can realize multi-channel broadcasting and access lines of 1 Gbps by putting communication and broadcasting into one optical fiber cable.

Then, in a G-PON type network structure as shown in FIG. 13, communication between a communication unit A, which is OLT or ONT, and communication units B1 through Bn, which are ONU and/or ONT, is in a relationship of 1:n. In order to prevent data (referred to as downstream data hereinafter) transmitted from the communication unit A from colliding with data (referred to as upstream data hereinafter) transmitted from the communication units B1 through Bn, the communication unit A continuously transmits the downstream data to the communication units B1 through Bn and the communication units B1 through Bn transmit the upstream data to the communication unit A in a time-division manner.

Specifically, the communication unit A measures communication time (Tb1 through Tbn) with the communication units B1 through Bn and instructs the communication units B1 through Bn to respond to the communication unit A corresponding to the measured time. Then, receiving the instruction, the communication units B1 through Bn transmit the upstream data by the specified time-division manner. It is noted that the series of processes described above is called as Ranging and the Ranging is always carried out once or more when the communication is physically established periodically or with a change of condition of the network as a momentum.

Because the communication between the communication unit A (OLT/ONT) and the communication units B1 through Bn (ONU/ONT) assumes the relationship of 1:n in the G-PON type network structure, it is essential for the communication units B1 through Bn to transmit the upstream data in the time-division manner. Still more, an occurrence of such collision of data may become a large trouble for a large-scale G-PON system in which a large number of communication units B (ONU/ONT) is connected to the communication unit A (OLT/ONT). Then, there have been disclosed various technologies for testing or verifying whether or not transmission/receiving of data between the communication unit A and the communication units B1 through Bn can be made correctly without collision by the Ranging described above.

For example, according to Patent Document 1 (JP Patent Application Laid-open No. 2005-20420), a testing apparatus for testing normal communication is composed of a standard OLT 1, an ONU-to-be-tested 2, a pseudo ONU 3 and a frame generator/tester 4 as shown in FIG. 14. The pseudo ONU 3 is an ONU that plays a pseudo role of simulating operations of a plurality of ONUs. When the frame generator/tester transmits data to the ONU-to-be-tested 2 in this structure, the ONU-to-be-tested 2 transmits the data to the standard OLT 1 with timing assigned (set) to the own unit. Then, the standard OLT 1 transmits the received data to the frame generator/tester 4 and the frame generator/tester 4 tests whether or not the data is transmitted with normal timing. The use of such testing apparatus allows the connected ONU to be tested one by one, the test of the complicated network to be readily carried out and troubles and problems to be readily detected as compared to a case of simultaneously testing all ONUs connected in the G-PON system.

However, the testing apparatus of Patent Document 1 described above merely tests only operations of the OLT and ONUs to the end and cannot test events occurring within the network, such as delayed insertion of input data, fluctuation or jitter of data arrival time, fall of part or all transmission data and reversal of sequence of data. When data arrival time to the ONU-to-be-tested 2 is late due to the event occurring within the network for example, the ONU-to-be-tested 2 cannot transmit data with timing (time-division) assigned to itself and may cause such a problem that data collision occurs between other ONUs and the OLT as a result. Therefore, it is necessary to test such events occurring within the network.

In general, a testing system in which testing apparatuses 1 through n and a testing apparatus 0 or a communication monitor are connected to the outside of the G-PON system (G-PON network) composed of a communication unit A (OLT/ONT) and communication units B1 through Bn (ONUs/ONTs) as shown in FIG. 15 is used. The testing apparatuses 0 through n used here are what test whether or not the units normally operate similarly to Patent Document 1 described above and the testing apparatus 0 tests events occurring within the network. When the communication monitor is used instead of the testing apparatus 0, the communication monitor detects the event occurring within the network by obtaining and analyzing data flowing within the G-PON system.

When the testing apparatus 0 is provided between the communication unit A (OLT/ONT) and the communication units B1 through Bn (ONUs/ONTs) in order to verify the event occurring within the network in the prior art technology described above, however, the data flowing within the G-PON system passes through the testing apparatus 0 and an error occurs in a data communication time within the system. Therefore, there has been a problem that data collision occurs even between the normally operating OLT and ONUs and that the testing apparatus 0 cannot test the event occurring within the network during the normal communication.

Specifically, all data within the G-PON system pass through the testing apparatus 0, fluctuating the communication time (Tb1 through Tbn) between the communication unit A and the communication units B1 through Bn. That is, when a test is being implemented between the communication unit A and the communication unit B1, the communication time between the communication unit A and the communication unit B1 fluctuates even though the communication is being normally implemented between the communication unit A and the communication unit B1 through Bn, causing such an event that data transmitted from the communication unit B1 collides against data transmitted from the communication unit B2. Therefore, the testing apparatus 0 cannot test the event occurring within the network in the normal communication.

The prior art technology described above has also had a problem that it requires an enormous amount of time because it obtains contents and result of test by obtaining and analyzing an enormous amount of data flowing within the G-PON system in testing the events occurring within the network.

SUMMARY

Accordingly, the present invention has been made to solve the prior art problems described above and its object is to provide a network testing apparatus, a network testing method and a network testing program capable of testing events occurring within the network during normal communications without requiring an enormous amount of time.

According to one aspect, the present invention relates to a network testing apparatus for testing events occurring within a network by constructed between an OLT or an ONT and an ONU or an ONT by connecting said OLT or ONT and ONU and ONT by one optical fiber. The network testing apparatus comprises testing item storing means for storing testing items related to the events occurring within said network and code numbers for identifying said testing items by correlating them from each other, testing data generating means for receiving data from said OLT, ONU or ONT, obtaining receiving time of the data and transmitting the data to a predetermined data buffer when no test is implemented or generating testing data in which a code number indicating a testing item is added to the data when a test is implemented, test implementing means for extracting the code number from the testing data generated by said testing data generating means, obtaining the testing item corresponding to the code number from said testing item storing means to implement the testing item and obtaining time when the testing item has been finished and data reading means for calculating a test time required for implementing said test from the time obtained by said testing data generating means and the time obtained by said test implementing means and for reading the data transmitted to the predetermined data buffer by said testing data generating means after an elapse of said calculated test time.

According to another aspect, the present invention relates to the network testing apparatus that comprises specific data transmitting means for transmitting data containing a specific sequence or specific code to said OLT, ONU or ONT and specific data selecting means for preferentially transmitting the data containing the specific sequence or the specific code transmitted from said specific data transmitting means to said testing data generating means.

According to still another aspect, the present invention relates to the network testing apparatus, the network testing apparatus further comprises testing data holding means for temporarily holding the testing data on which a test has been implemented by said test implementing means and said specific data transmitting means transmits specific data into which a code number of a testing item which takes a longest processing time in the test implemented by said test implementing means is added and obtains time when the specific data has been transmitted, said testing data generating means outputs said specific data as said testing data to said test implementing means when it receives the specific data from said specific data transmitting means, said test implementing means extracts a code number from the testing data generated by said testing data generating means, implements the testing item by obtaining the testing item corresponding to the code number from said testing item storing means and obtains time when the testing item has been finished and said data reading means calculates a test implementing longest time that is a longest processing time when said test is implemented from the time obtained by said test implementing means and the time obtained by said specific data transmitting means and then extracts a differential time between the test implementing longest time and the time calculated by said test implementing means when said testing data generating means receives the data and the test implementing means implements the test to read the data transmitted to said testing data holding means after an elapse of said differential time and to read the data transmitted to the predetermined buffer by said testing data generating means after an elapse of said test implementing longest time when said testing data generating means receives the data and the data is transmitted to the predetermine data buffer.

Accordingly to yet another aspect, the present invention relates to the network testing apparatus, the network testing apparatus further comprises ONU delay time adjusting means for measuring a communication delay time within the ONU from the data transmitted time and response received time when it receives, from the ONU, the response to the data read by said data reading means and transmitted to the ONU and for transmitting the data read by said data reading means to the ONU by adjusting said communication delay time.

According to yet a further aspect, the present invention relates to the network testing apparatus, the network testing apparatus further comprises code number deleting means for transmitting the data read from said data reading means to said OLT, ONU or ONT by removing said code number from the data when said code number is added to the data.

According to still another aspect, the present invention relates to the network testing apparatus, the network testing apparatus further comprises splitting means for splitting the data and testing data transmitted by said testing data generating means to said predetermined data buffer or to said test implementing means.

According to still another aspect, the present invention relates to a network testing method suitable for testing events occurring within a network constructed between an OLT or an ONT and an ONU or an ONT by connecting said OLT or ONT and ONU and ONT by one optical fiber. The network testing method comprises a testing item storing step of storing testing items related to the events occurring within said network and code numbers for identifying said testing items by correlating them from each other, a testing data generating step of receiving data from said OLT, ONU or ONT, obtaining receiving time of the data and transmitting the data to a predetermined data buffer when no test is implemented or generating testing data in which a code number indicating a testing item is added to the data when a test is implemented, a test implementing step of extracting the code number from the testing data generated in said testing data generating step, obtaining the testing item corresponding to the code number from said testing item storing means to implement the testing item and obtaining time when the testing item has been finished and a data reading step of calculating a test time required for implementing said test from the time obtained in said testing data generating step and the time obtained in said test implementing step and for reading the data transmitted to the predetermined data buffer in said testing data generating step after an elapse of said calculated test time.

According to still another aspect, the present invention relates to a recording medium that stores a network testing program that makes a computer to implement a test of events occurring within a network constructed between an OLT or an ONT and an ONU or an ONT by connecting said OLT or ONT and ONU and ONT by one optical fiber, characterized in that the network testing program makes the computer to implement a testing item storing procedure for storing testing items related to the events occurring within said network and code numbers for identifying said testing items by correlating them from each other, a testing data generating procedure for receiving data from said OLT, ONU or ONT, obtaining receiving time of the data and transmitting the data to a predetermined data buffer when no test is implemented or generating testing data in which a code number indicating a testing item is added to the data when a test is implemented, a test implementing procedure for extracting the code number from the testing data generated by said testing data generating procedure, obtaining the testing item corresponding to the code number from said testing item storing procedure to implement the testing item and obtaining time when the testing item has been finished and a data reading procedure for calculating a test time required for implementing said test from the time obtained by said testing data generating procedure and the time obtained by said test implementing procedure and for reading the data transmitted to the predetermined data buffer by said testing data generating procedure after an elapse of said calculated test time.

BRIEF DESCRIPTION OF THE DRAWINGS

FIG. 3 shows schematically a table showing exemplary information stored in a testing item DB shown in FIGS. 1 and 2;

DESCRIPTION OF THE PREFERRED EMBODIMENTS

Embodiments of a network testing apparatus, a network testing method and a network testing program of the invention will be explained in detail below with reference to the drawings. It is noted that in the description below, main terms used in the present embodiment, an outline and features of a G-PON network testing apparatus of the present embodiment and a configuration and a flow of processes of the G-PON network testing apparatus will be explained sequentially in order and various modifications of the embodiment will be explained at last.

First Embodiment

Explanation of Terms

At first, main terms used in the present embodiment will be explained. PON (Passive Optical Network) used in the present embodiment is a system for transmitting optical signals to a plurality of subscriber's homes by splitting one optical fiber by an optical splitter or the like as one of technologies for realizing FTTH (Fiber To The Home) for transmitting the optical signals transmitted from an accommodating station such as a common carrier to the plurality of subscriber's homes. Then, among the PON, a PON whose transmission frame is a fixed length frame of period of 125 micro-seconds that is the same period with a basic time unit of the conventional telecommunication services and which enables one to efficiently use the existing services such as telephones and dedicated lines is called specifically as G-PON (Gigabit-passive Optical Networks). In the G-PON (or PON), an OLT (Optical Line Terminal) within the accommodating station and a plurality of ONU/ONT (Optical Network Unit/Optical Network Termination) installed on the side of the subscriber's homes are configured in a model of point-to-multi-points. Note that a case of adopting the G-PON will be explained in the present embodiment. The G-PON testing apparatus explained in the present embodiment corresponds also to the network testing apparatus.

Figure 14:
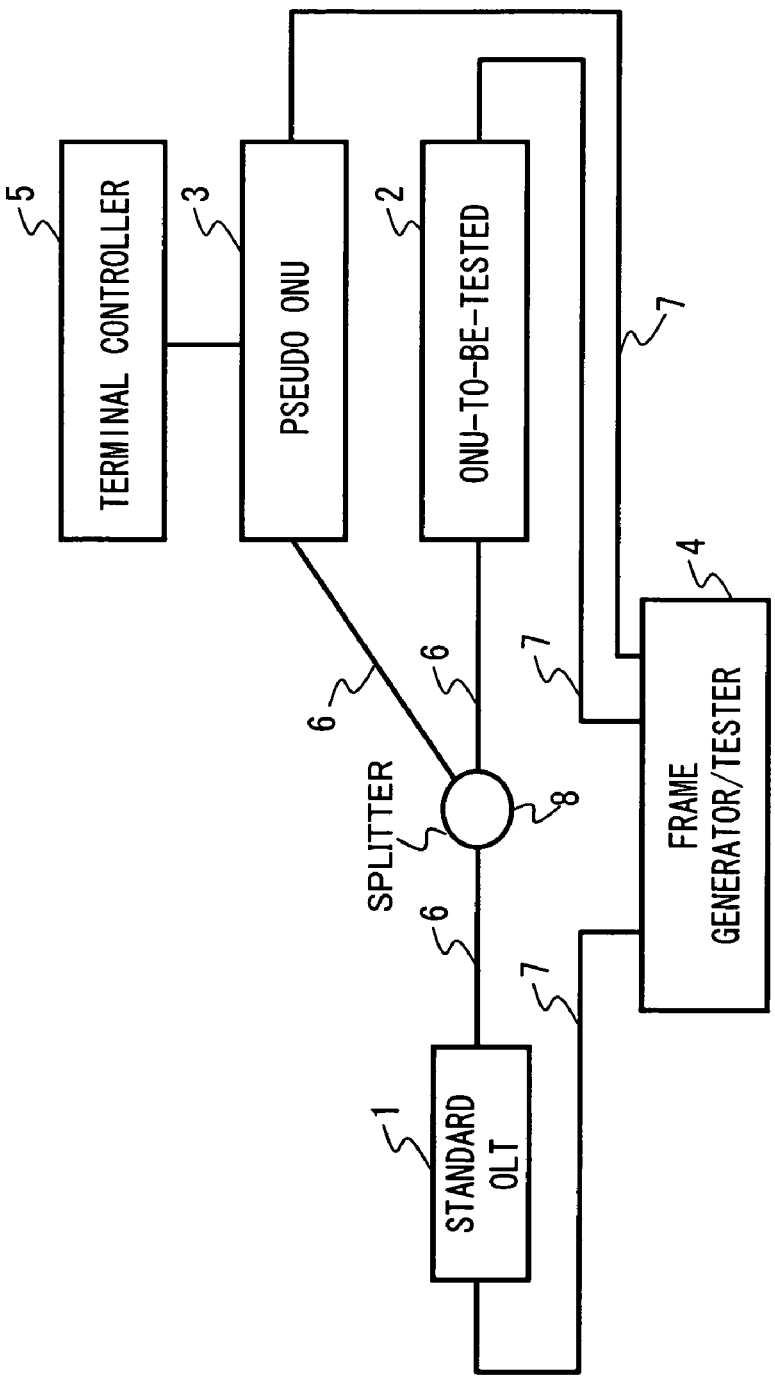
FIG. 14 shows a diagram explaining a prior art.
Figure 15:
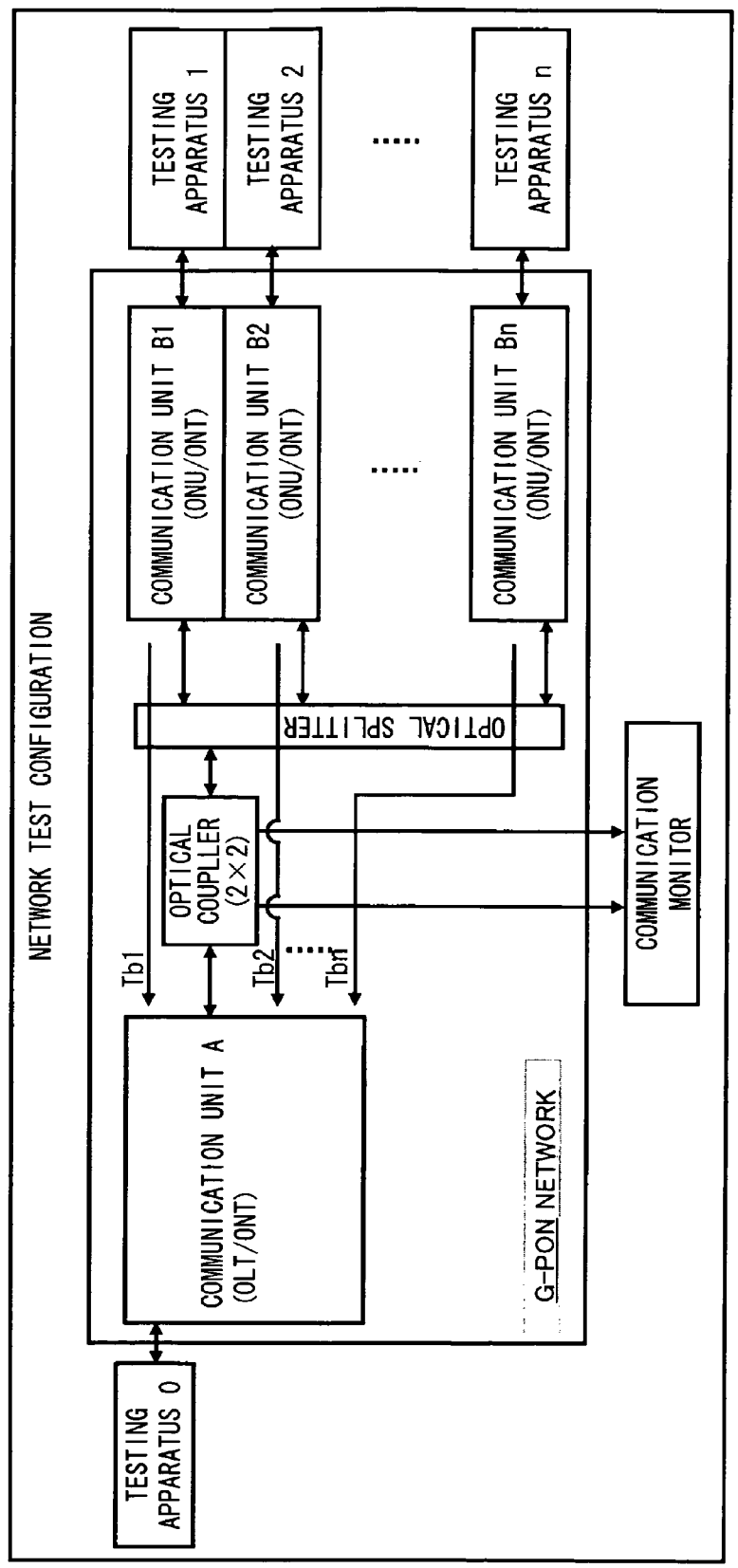
FIG. 15 shows a diagram explaining a prior art.

In such G-PON, one optical fiber connected to OLT must be connected to a plurality of ONU. Therefore, data (signal) transmitted from the plurality of ONUs to the OLT is transmitted exclusive timing (time-divided timing) so that the signals do not collide on one optical fiber. It is possible to test whether or not the plurality of ONU and the OLT normally operate by the testing method shown in FIG. 14 or 15.

However, beside that whether or not the plurality of ONUs transmits with the exclusive timing (time-divided timing), events occurring on the network (such as delayed insertion of input data, fluctuation (jitter) of data arrival time, fall of part or all transmission data and reversal of sequence of data) may affect the configuration of the G-PON system in order to avoid the collision of data on one optical fiber. Therefore, it becomes important to detect such events on the network in addition to testing whether or not the plurality of ONUs transmits with the exclusive timing (time-divided timing).

[Outline and Features of G-PON Network Testing Apparatus]

Figure 1:
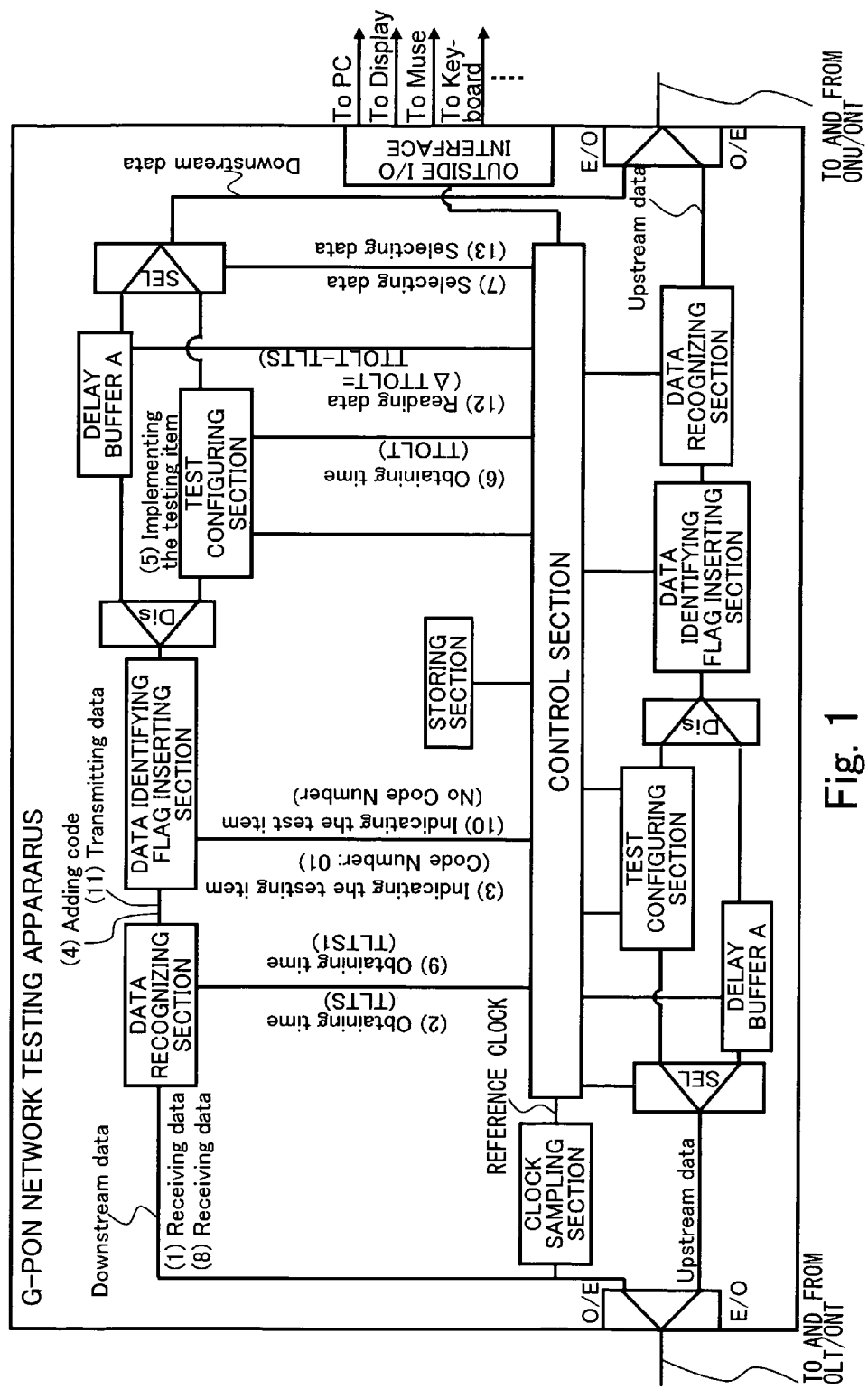
FIG. 1 shows a schematic diagram explaining an outline and features of a G-PON network testing apparatus according to an embodiment.

Next, the outline and features of the G-PON network testing apparatus of a first embodiment will be explained by using FIG. 1. FIG. 1 is a diagram explaining the outline and features of the G-PON network testing apparatus of the first embodiment. It is noted that although a case of implementing a test on data (Downstream data) outputted out of the OLT or the like will be explained here, the present invention is not limited to that and the test may be implemented in the same manner even to data (Upstream data) outputted out of the ONUs or the like.

As shown in FIG. 1, this G-PON network testing apparatus composes a G-PON system by being connected between the OLT or ONT and the plurality of ONUs or ONTs. Then, the plurality of ONUs transmits signals to the OLT through the G-PON network testing apparatus at the exclusive timing (time-divided timing) so that the signals do not collide on one optical fiber.

Under such configuration, the outline of the G-PON network testing apparatus is that it tests events occurring within the network in the G-PON system described above and its main feature is that it can test the events occurring within the network during normal communications specifically without requiring an enormous amount of time.

The main feature will be specifically explained. The G-PON network testing apparatus stores testing items related to the events occurring within the network and code numbers for identifying the testing items by correlating them from each other. Specifically, for example, the G-PON network testing apparatus stores "01, delayed insertion of input data", "02, fluctuation (jitter) of data arrival time" and "03, fall of part or all transmission data" to a storing section as the [code number (Flag) indicating the testing item and content of test indicating the content of the testing item].

Then, receiving the data from the OLT, ONUs or ONTs, a data recognizing section of the G-PON network testing apparatus obtains data receiving time, a data identification flag inserting section transmits the data to a predetermined buffer when no test is implemented on the received data and generates testing data in which the code number indicating the testing item is added to the data when the test is to be implemented and a test configuring section obtains the testing item corresponding to the code number from the storing section to carry out the testing item. A delay buffer A temporarily stores the data transmitted from the data identifying Flag inserting section and a control section controls the respective functional sections described above. A Dis is a circuit for splitting data and testing data transmitted from the data identifying Flag inserting section to the delay buffer A or the test configuring section and SEL is a circuit for receiving (collecting) data from the test configuring section or the delay buffer A.

In such state, receiving the data from the OLT, ONUs or ONTs, the G-PON network testing apparatus obtains data receiving time and transmits the data to the predetermined buffer when no test is implemented and generates the testing data in which the code number indicating the testing item is added to the data when the test is to be implemented (see steps (1) through (4) in FIG. 1). Specifically, when the data recognizing section of the G-PON network testing apparatus receives the data from the OLT or ONT for example, it obtains the data receiving time (TLTS) and outputs the data to the data identifying Flag inserting section. In succession, the control section instructs the data identifying Flag inserting section to add the code number 01 for implementing the test to the data. Then, the data identifying Flag inserting section generates the testing data in which the code number 01 indicating the testing item is added to the data and outputs the data to the test configuring section. It is noted that the instruction for implementing the test may be set in advance or may be controlled by a user from the outside.

Then, the test configuring section of the G-PON network testing apparatus extracts the code number from the testing data generated by the data identifying Flag inserting section, implements the testing item by obtaining the testing item corresponding to the code number from the storing section and obtains time when the testing item ends (see steps (5) and (6) in FIG. 1). This will be specifically explained by the example described above. The test configuring section of the G-PON network testing apparatus extracts the code number 01 from the testing data generated by the data identifying Flag inserting section, implements the testing item "delayed insertion of input data" corresponding to the code number 01 by obtaining it from the storing section, obtains the time TTOLT when the testing item ends and outputs the testing data to SEL.

After that, the control section of the G-PON network testing apparatus selects the testing data outputted to the SEL and outputs to an outside unit (see (7) in FIG. 1). Various analyses are carried out on the testing data thus outputted to the outside to verify the test. It is noted that the testing processes described above may be implemented per testing item stored in the storing section to calculate time necessary for the test or may be implemented after constructing the system.

Then, when the data recognizing section of the G-PON network testing apparatus receives data again from the OLT or ONT, it obtains data receiving time (TLTS1) and outputs the data to the data identifying Flag inserting section (see Steps (8) and (9) in FIG. 1. Next, the control section instructs the data identifying Flag inserting section to add a code number "–(null)" indicating no test is implemented to the data when no test is implemented on the data. Then, the data identifying Flag inserting section nullifies the code number indicating the testing item in the data and outputs the data to the delay buffer A (see (11) in FIG. 1).

Then, the control section of the G-PON network testing apparatus calculates a test time required for implementing the testing item from the time obtained by the data recognizing section and the time obtained by the test configuring section and reads the data transmitted by the data recognizing section to the delay buffer A after an elapse of the calculated test time (see (12) in FIG. 1). This will be explained concretely by the example described above. The control section of the G-PON network testing apparatus calculates the test time ΔTTOLT=TTOLT−TLTS required for implementing the testing item from the time (TLTS) obtained by the data recognizing section in (2) in FIG. 1 described above and the time TTOLT calculated in (6) in FIG. 1 and reads the data transmitted to the delay buffer A after the elapse of the test time ΔTTOLT calculated from the time TLTS1 of the data receiving time.

Then, the control section of the G-PON network testing apparatus selects the data outputted to the SEL and outputs it to the outside unit (See (13) in FIG. 1). It is noted that although a case of eliminating a difference of communication times when the test is implemented and not implemented by calculating the time ΔTTOLT necessary for the test in the testing item 01 and by temporarily storing the data for the calculated time ΔTTOLT even if no test is implemented, the other testing items may be carried out in the same manner. In such a case, it may be arranged so as to calculate the time required for the test in advance or so as to calculate the time required for the test by implementing a test once in constructing the system as described above.

Thus, the G-PON network testing apparatus of the first embodiment can test even the events such as delayed insertion of input data, fluctuation (jitter) of data arrival time, fall of part or all transmission data and reversal of sequence of data when the ONU or ONT transmits data normally with the assigned (time-divided) timing. It can also implement the test in a short time without obtaining and analyzing the data flowing within the network. As a result, it can test the events occurring within the network during the normal communications without requiring an enormous amount of time.

[Configuration of G-PON Network Testing Apparatus]

Figure 2:
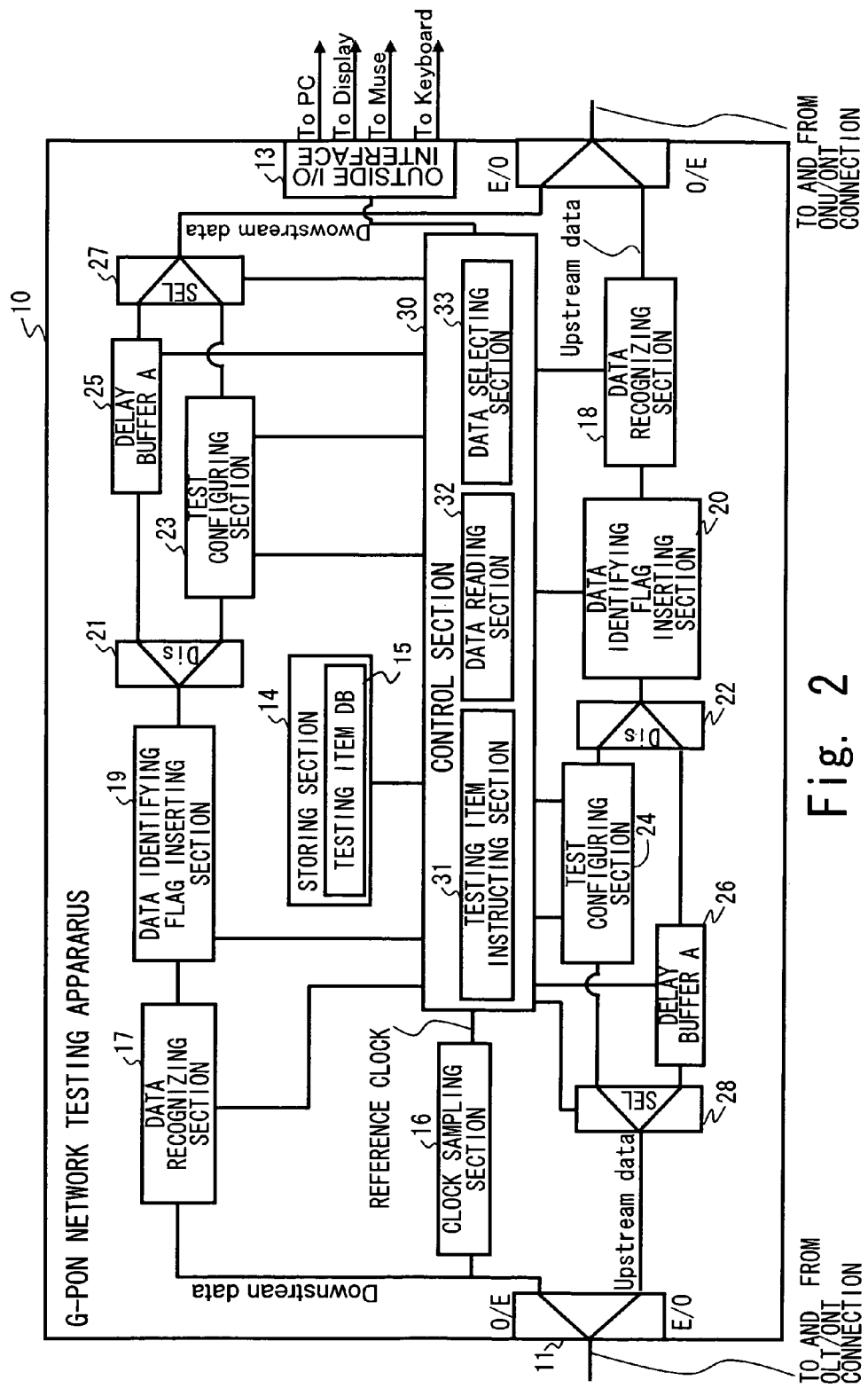
FIG. 2 shows a schematic block diagram showing a configuration of the G-PON network testing apparatus according to the embodiment shown in FIG. 1.

Next, the configuration of the G-PON network testing apparatus shown in FIG. 1 will be explained by using FIGS. 2 and 3. FIG. 2 is a block diagram showing the configuration of the G-PON network testing apparatus of the first embodiment and FIG. 3 is a table showing exemplary information stored in a testing item DB.

As shown in FIG. 2, the G-PON network testing apparatus 10 has communication control I/F sections 11 and 12, an outside IO interface 13, a storing section 14, a clock sampling section 16, data recognizing sections 17 and 18, data identifying Flag inserting sections 19 and 20, Dises 21 and 22, test configuring sections 23 and 24, delay buffers A 25 and 26, SELs 27 and 28 and a control section 30.

The communication control I/F sections 11 and 12 control communications related various information exchanged between the OLT, ONU or ONT. Specifically, for example, the communication control I/F section 11 receives data (downstream data) continuously transmitted from the OLT to output it to the data recognizing section 17 described later and outputs data (upstream data) outputted out of the SEL 28 described later to the OLT or ONT. The communication control I/F section 12 also receives upstream data transmitted from the ONU in time-division manner to output to the data recognizing section 18 described later and transmits downstream data outputted out of the SEL 27 described later to the ONU or ONT.

The outside IO interface 13 connects various devices for enabling the user to control the G-PON network testing apparatus 10. Specifically, the outside IO interface 13 connects 10 devices such as a keyboard, mouse, microphone, monitor (or a display and touch panel) and a speaker and a PC (Personal Computer) for reading and verifying test results.

The storing section 14 stores data and programs necessary for various processes of the control section 30 and has the testing item DB 15 specifically as what is closely related to the present invention. The testing item DB 15 stores testing items related to events occurring within the network and code numbers for identifying the testing items by correlating them from each other. Specifically, for example, the testing item DB 15 stores "01, delayed insertion of input data", "02, fluctuation (jitter) of data arrival time" and "03, fall of part or all transmission data" to the storing section as the [code number (Flag) indicating the testing item and content of test indicating the content of the testing item] as shown in FIG. 3. It is noted that the testing item DB 15 is not necessary to be provided within the G-PON network testing apparatus 10 and may be connected to the outside. Furthermore, various data and information containing parameters may be changed arbitrarily except of cases specifically noted. The testing item DB 15 corresponds to test item storing means.

The clock sampling section 16 is a circuit for generating reference clock of an internal timer within the G-PON network testing apparatus 10. Time error may be minimized by setting the reference clock generated by the clock sampling section 16 as 0 and by counting a timer from the reference clock 0 in calculating time by the data recognizing sections 17 and 18 and the test configuring sections 23 and 24 described later.

The data recognizing sections 17 and 18 obtain time of the data received by the communication control I/F sections 11 and 12 from the OLT, ONU or ONT de-scramble the received data and output to the data identifying Flag inserting sections 19 and 20 described later. Specifically, for example, when the downstream data (the downstream data is composed of delimiter, header information, information on destination of transmission, data and others) outputted out of the OLT and others and received by the communication control I/F section 11 is inputted, the data recognizing section 17 obtains the inputted (received) time (TLTS) from the header information, position of delimiter and others, stores it temporarily in the storing section or the like and de-scrambles the received data to output to the data identifying Flag inserting section 19 described later. When the upstream data (the upstream data is composed of delimiter, header information, information on destination of transmission, data and others) outputted out of the ONU and others and received by the communication control I/F section 12 is inputted, the data recognizing section 18 obtains the inputted (received) time, stores it temporarily in the storing section or the like and de-scrambles the received data to output to the data identifying Flag inserting section 20 described later.

When no test is implemented on the data inputted from the data recognizing sections 17 and 18, the data identifying Flag inserting sections 19 and 20 transmit the data to the delay buffers A 25 and 26 and when the test is implemented, generates testing data in which the code number (e.g., Flag=01) indicating the testing item is added to the header information in the data. This will be explained concretely by using the example described above. When no test is implemented on the data inputted by the data recognizing section 17, the data identifying Flag inserting section 19 transmits the data to the delay buffer A 25 and when the test is implemented, generates the testing data by adding the code number indicating the testing item specified by the user or defined in advance and obtained from the testing item DB 15 and outputs the testing data to the test configuring section 23 described later.

When no test is implemented on the data inputted from the data recognizing section 18, the data identifying Flag inserting section 20 transmits the data to the delay buffer A 26 and when the test is implemented, generates testing data in which the code number (e.g., Flag=01) indicating the testing item specified by the user or defined in advance and obtained from the testing item DB 15 is added to the header information in the data and outputs the testing data to the test configuring section 24 described later. It is noted that the data recognizing sections 17 and 18 and the data identifying Flag inserting sections 19 and 20 correspond to test data generating means.

The Dises 21 and 22 are circuits for splitting the data transmitted from the data identifying Flag inserting sections 19 and 20 to the test configuring sections 23 and 24 or to the delay buffers A 25 and 26. This will be explained concretely by the example described above. When the Dis 21 receives data into which no testing item is added by the data identifying Flag inserting section 19, it outputs the data to the delay buffer A 25 and when it receives testing data into which the testing item is added, it outputs the testing data to the test configuring section 23. Similarly to that, when the Dis 22 receives data into which no testing item is added by the data identifying Flag inserting section 20, it outputs the data to the delay buffer A 25 and when it receives testing data into which the testing item is added, it outputs the data to the test configuring section 24. It is noted that the Dises 21 and 22 correspond to splitting means.

The test configuring sections 23 and 24 extract a code number from the testing data generated by the data identifying Flag inserting sections 19 and 20, obtains the testing item corresponding to the code number from the testing item DB 15 to implement the testing item and obtains time when the testing item ends. This will be explained concretely by the example described above. Receiving the testing data generated by the data identifying Flag inserting section 19 from the Dis 22, the test configuring section 23 extracts a code number such as Flag=01 from the testing data, obtains the testing item "delayed insertion of input data" corresponding to the code number 01 from the testing item DB 15 to implement the testing item, obtains time TTOLT when the testing item ends and stores temporarily in the storing section 14 and others and outputs the testing data to the SEL 27 described later. Similarly to that, the test configuring section 24 extracts a code number such as Flag=03 from the testing data by receiving the testing data generated by the data identifying Flag inserting section 20 from the Dis 21, obtains the testing item "fall of part or whole transmitted data" corresponding to the code number 03 from the testing item DB 15 to implement the testing item, obtains time TTOLT2 when the testing item ends and stores temporarily in the storing section 14 and others and outputs the testing data to the SEL 28 described later. It is noted that the test configuring sections 23 and 24 correspond to test implementing means.

The delay buffers A 25 and 26 temporarily store the data transmitted from the data identifying Flag inserting sections 19 and 20 and output the stored data corresponding to an instruction of a data reading section 32 described layer. This will be explained concretely by the example described above. When the delay buffer A 25 receives the data outputted out of the data identifying Flag inserting section 19 via the Dis 21, it stores the data until it receives an output instruction from the data reading section 32 described later. Similarly to that, when the delay buffer A 26 receives the data outputted out of the data identifying Flag inserting section 20 via the Dis 22, it stores the data until it receives an output instruction from the data reading section 32 described later. It is noted that the delay buffers A 25 and 26 correspond to predetermined data buffers.

The SELs 27 and 28 are circuits for selecting data among the data outputted out of the test configuring sections 23 and 24 or of the delay buffers A 25 and 26 corresponding to an instruction of a data selecting section 33 described later and for transmitting the selected data to the OLT, ONU or ONT. This will be explained concretely by the example described above. The SEL 27 receives the testing data from the test configuring section 23 and receives the data from the delay buffer A 25. Then, the SEL 27 selects either data corresponding to the instruction of the data selecting section 33 described later and transmits the selected data to the ONU or ONT. Similarly to that, the SEL 28 receives the testing data from the test configuring section 24 and receives the data from the delay buffer A 26. Then, the SEL 28 selects either data corresponding to the instruction of the data selecting section 33 described later and transmits the selected data to the ONU or ONT.

The control section 30 has an internal memory for storing control programs such as OS (Operating System), programs specifying various processing procedures and necessary data and specifically the testing item instructing section 31, the data reading section 32 and the data selecting section 33 as what are closely related to the present invention. These sections execute various processes.

The testing item instructing section 31 instructs the data identifying Flag inserting sections 19 and 20 about the testing item or code number to be added to data. Specifically, the testing item instructing section 31 instructs the data identifying Flag inserting sections 19 and 20 to add the testing item or code number to the received data in accordance to an instruction of the user specified in advance or received through an outside IO interface. For example, when the test of "delayed insertion of input data" is to be implemented, the testing item instructing section 31 instructs the data identifying Flag inserting sections 19 and 20 to add the code number (Flag=01) to the received data because "01, delayed insertion of input data" is stored by correlating from each other in the testing item DB 15. Furthermore, when no test is implemented, the testing item instructing section 31 instructs so as not add anything or to add the code number (Flag=00).

The data reading section 32 calculates a test time required for implementing the testing item from the time obtained by the data identifying Flag inserting sections 19 and 20 and the time obtained by the test configuring sections 23 and 24 and reads the data transmitted from the data identifying Flag inserting sections 19 and 20 to the delay buffers A 25 and 26 after an elapse of the calculated test time. This will be explained concretely by the example described above. The data reading section 32 calculates a test time ($\Delta$TTOLT=TTOLT−TLTS) required for implementing the testing item from the time (TLTS) obtained by the data identifying Flag inserting section 19 and the time (TTOLT) obtained by the test configuring section 23 and reads the data transmitted from the data identifying Flag inserting section 19 to the delay buffer A 25 after an elapse of the test time ($\Delta$TTOLT) calculated from the data receiving time TLTS1. It is noted that the data reading section 32 corresponds to data reading means.

The data selecting section 33 selects necessary data among the data outputted to the SELs 27 and 28 and instructs the SELs 27 and 28 to transmit it to the OLT, ONU or ONT. Specifically, when a test has been implemented, the data selecting section 33 instructs the SELs 27 and 28 to select the data received from the test configuring sections 23 and 24 among the received data to transmit to the OLT, ONU or ONT. When no test has been implemented, it instructs the SELs 27 and 28 to select the data received from the delay buffers A 25 and 26 among the received data to transmit to the OLT, ONU or ONT.

[Processes Performed by G-PON Network Testing Apparatus]

Figure 4:
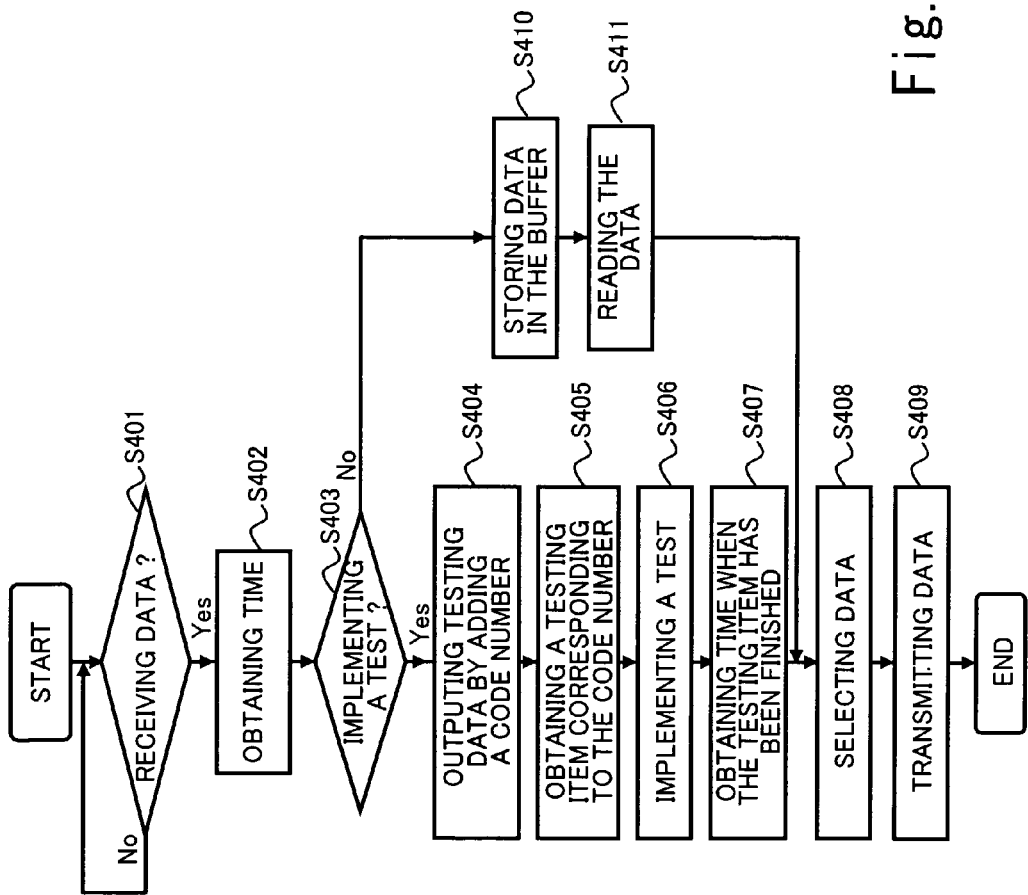
FIG. 4 shows a schematic flowchart showing a flow of processes in the G-PON network testing apparatus of the embodiment shown in FIGS. 1 and 2.

Next, processes performed by the G-PON network testing apparatus will be explained by using FIG. 4. FIG. 4 is a flowchart showing a flow of processes in the G-PON network testing apparatus of the first embodiment.

Receiving data from the OLT or ONT via the communication control I/F section 11 (Yes in Step S401) as shown in FIG. 4, the data recognizing section 17 of the G-PON network testing apparatus 10 obtains time of the data, de-scrambles the received data and outputs it to the data identifying Flag inserting section 19 descried later (Step S402).

IN succession, the data identifying Flag inserting section 19 receives an instruction from the 31 whether or not a test is implemented on the data (Step S403). When the test is implemented (Yes in Step S403), the data identifying Flag inserting section 19 generates testing data by adding a code number indicating a content of the test to the data and outputs it to the test configuring section 23 (Step S404).

Then, the test configuring section 23 extracts the code number from the testing data, obtains a testing item corresponding to the code number from the testing item DB 15 to implement the testing item and obtains time when the testing item has been finished (Steps S405 through S407).

After that, the test configuring section 23 outputs the testing data to the SEL 27 and the SEL 27 selects data corresponding to an instruction from the data selecting section 33 (Step S408) to transmit to the OLT, ONU or ONT (Step S409).

When no test is implemented (No in Step S403) in contrary, the data identifying Flag inserting section 19 transmits the data to the delay buffer A 25 to store in the buffer (Step S410).

After that, the data reading section 32 calculates a test time required for implementing the testing item from the time obtained by the data identifying Flag inserting section 19 and the time obtained by the test configuring section 23 and reads the data transmitted from the data identifying Flag inserting section 19 to the delay buffer A 25 after an elapse of the calculated test time (Step S411).

Then, the test configuring section 23 outputs the testing data to the SEL 27 and the SEL 27 selects data corresponding to an instruction of the data selecting section 33 (Step S408) to transmit to the OLT, ONU or ONT (Step S409).

Effects of First Embodiment

Thus, according to the first embodiment, it is possible to test the events occurring within the network during normal communications without requiring an enormous amount of time because the network testing apparatus, network testing method or network testing program stores testing items related to the events occurring within the network and code numbers for identifying the testing items by correlating them from each other, receives data from the OLT, ONU or ONT and obtains receiving time of the data and transmits the data to the data buffers A 25 and 26 when no test is implemented or generates testing data in which a code number indicating a testing item is added to the data when a test is implemented, extracts the code number from the generated testing data, obtains the testing item corresponding to the code number from the testing item DB 15 to implement the testing item and obtains time when the testing item has been finished and calculates a test time required for implementing the test from the obtained data receiving time and the test finishing time and reads the data transmitted to the data buffers A 25 and 26 after an elapse of the calculated test time.

For example, it is possible to test such events as delayed insertion of input data, fluctuation (jitter) of data arrival time, fall of part or all transmission data and reversal of sequence of data during when the ONU or ONT normally transmits data with the assigned timing (time-divided) and to implement the test in a short time without requiring to obtain and analyze data flowing within the network.

Furthermore, it is possible to reduce a cost for constructing the G-PON system or the like as a result of having the line for implementing the test and the line for transmitting data without implementing any test by having the testing apparatus within the network and to unify a communication time when the test is implemented and no test is implemented as a result that it is possible to adjust an error (communication delay time) of transmission time that occurs when the test is implemented.

Figure 5:
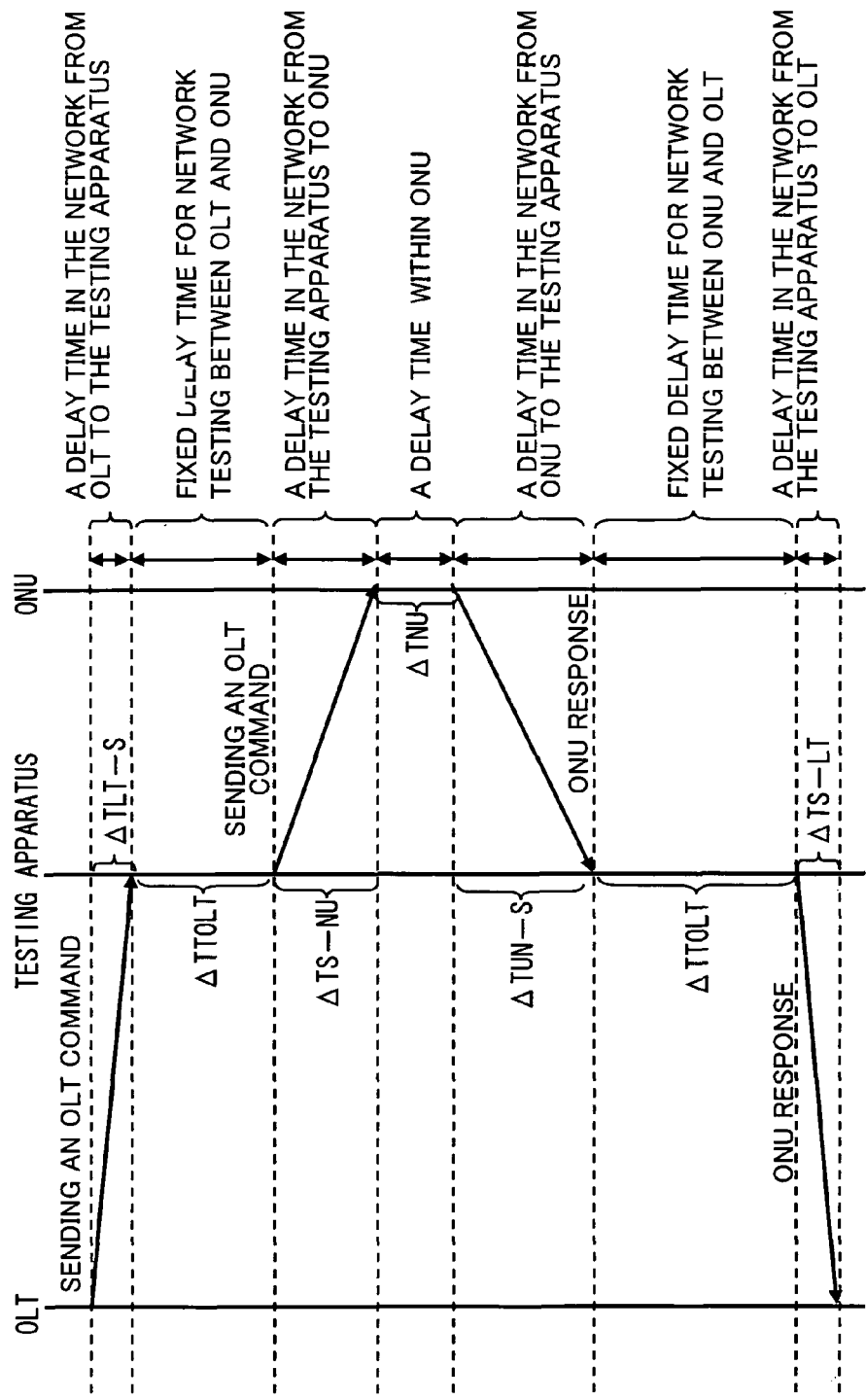
FIG. 5 shows a schematic chart explaining communication delay within a network.

The delay time within the network will be explained in concrete. As shown in FIG. 5, the OLT transmits data to the G-PON network testing apparatus and the G-PON network testing apparatus implements a test and transmits the data to the ONU. A delay occurs in the communication time during this interval by the test ($\Delta$TLT-S). Then, because the delay occurs in the communication time by the test, a delay of communication occurs also between the G-PON network testing apparatus and the ONU ($\Delta$TS-NU).

Then, because the delay thus occurs in the communication, a delay occurs in the communication more than the normal time also within the ONU ($\Delta$TLT-S). Furthermore, because a delay of communication ($\Delta$TS-NU) also occurs between the OLT and the G-PON network testing apparatus when the OLT transmits data and a delay of communication ($\Delta$TNU-S) occurs between the ONU that has transmitted a response to the data and the G-PON network testing apparatus as described above, a delay of communication ($\Delta$TS-LT) occurs also between the G-PON network testing apparatus that transfers the response and the OLT. That is, a delay of ($\Delta$TS-NU+($\Delta$TNU-S)+($\Delta$TNU-S)+($\Delta$TS-LT) as compared to the normal communication time in the flow of series of processes that the OLT transmits data to the ONU via the G-PON network testing apparatus and the ONU transmits the response to the data to the OLT via the G-PON network testing apparatus. As a result, collision of data occurs even though the normal communication is made. It is noted that FIG. 5 is a chart explaining the communication delay within the network.

Furthermore, according to the first embodiment, it is possible to reliably split the data on which no test is implemented and the data on which a test is implemented because the network testing apparatus splits the transmitted data and testing data by the data buffers A 25 and 26 or the test configuring sections. For example, the provision of the split circuit can assure a communication path and minimizes a risk of erroneously splitting the data on which no test is implemented and the data on which a test is implemented. As a result, they may be reliably split.

Second Embodiment

By the way, while the case of calculating the time required for the test per testing item and of adjusting the communication delay time has been explained in the first embodiment, the invention is not limited to such case and the communication delay time may be adjusted by calculating a longest test implementing time by implementing a test that takes a longest processing time and by utilizing the longest test implementing time.

Then, a case of adjusting the communication delay time by utilizing the longest test implementing time will be explained by using FIG. 6. It is noted that the configuration of the G-PON network testing apparatus of the second embodiment and effects of the second embodiment will be explained in the second embodiment.

[Configuration of G-PON Network Testing Apparatus (Second Embodiment]

The configuration of the G-PON network testing apparatus of the second embodiment will be explained by using FIG. 6. FIG. 6 is a block diagram showing the configuration of the G-PON network testing apparatus of the second embodiment.

Figure 6:
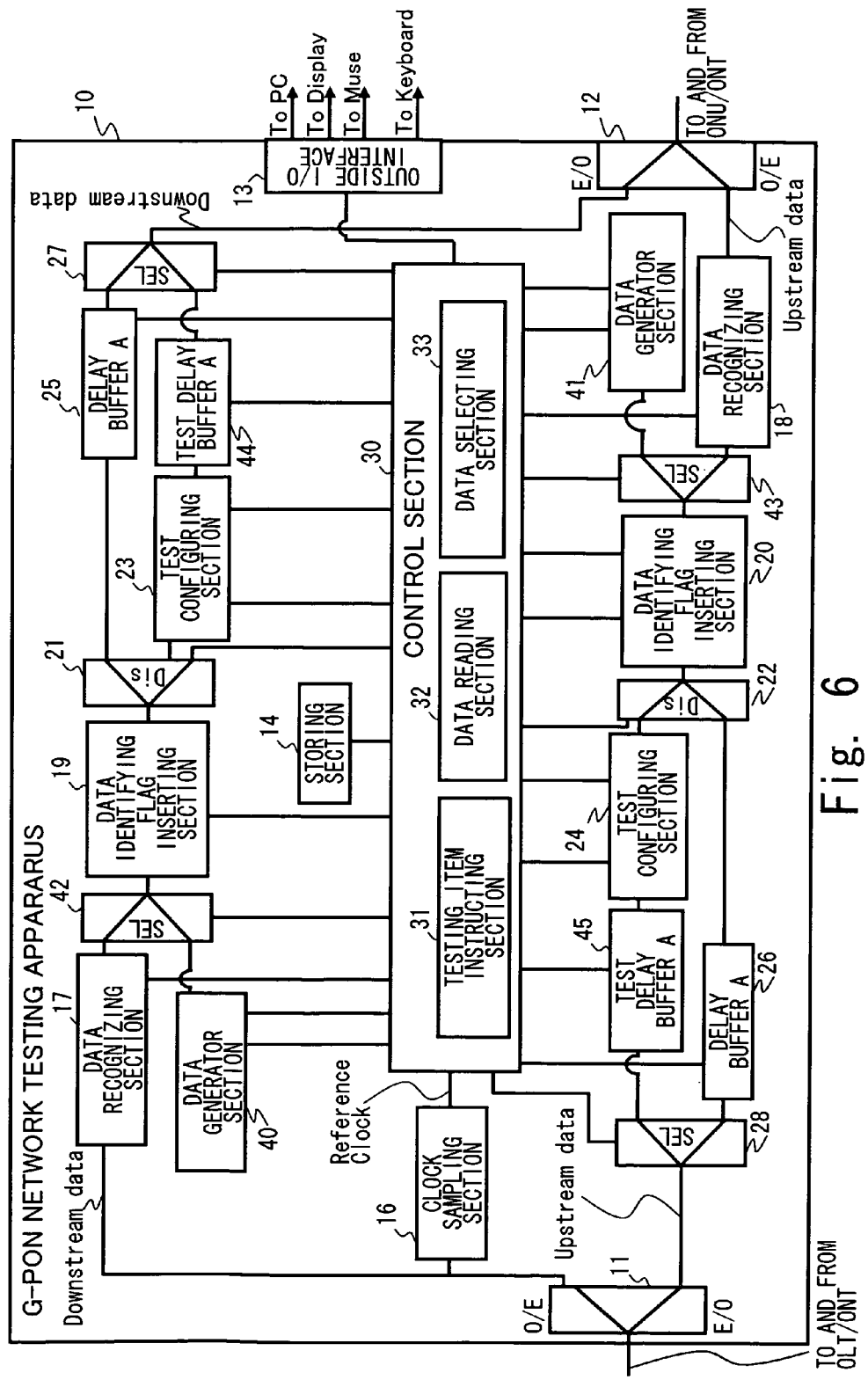
FIG. 6 shows a schematic block diagram showing the configuration of the G-PON network testing apparatus according to another embodiment.

As shown in FIG. 6, the G-PON network testing apparatus 10 has the communication control I/F sections 11 and 12, the outside IO interface 13, the storing section 14, the clock sampling section 16, the data recognizing sections 17 and 18, the data identifying Flag inserting sections 19 and 20, the Dises 21 and 22, the test configuring sections 23 and 24, the delay buffers A 25 and 26, the SELs 27 and 28, the control section 30, data generator sections 40 and 41, SELs 42 and 43 and Test delay buffers A 44 and 45.

Among them, the communication control I/F sections 11 and 12, the outside IO interface 13, the storing section 14, the clock sampling section 16, the data recognizing sections 17 and 18, the data identifying Flag inserting sections 19 and 20, the Dises 21 and 22, the test configuring sections 23 and 24, the delay buffers A 25 and 26, the SELs 27 and 28, the testing item instructing section 31 and the data selecting section 33 of the control section 30 have the same functions with those in FIG. 2 explained in the first embodiment, so that their detailed explanation will be omitted here. Here, and the data reading section 32 of the control section 30 having different functions with those in the first embodiment will be explained.

The data generator sections 40 and 41 transmit data containing specific sequence or specific code and specific data into which a code number of a testing item that takes a longest processing time is added in the test implemented by the test configuring sections 23 and 24 to the connected OLT, ONU or ONT and obtains time when the specific data is transmitted. Specifically, for example, the data generator sections 40 and 41 transmit the specific sequence such as OAM (Operations Administration and Maintenance) and OMCI (ONU Management Control Interface) described in the ITU-T G984 and specific data such as—code in PLOAM (Physical Layer OAM) to the connected OLT, ONU or ONT via the SELs 42 and 43 described later. The data generator sections 40 and 41 also transmit the specific data into which the code number (e.g., 03) of the testing item that takes a longest processing time to the SELs 42 and 43 described later and obtains transmitting time TOD in the test implemented by the test configuring sections 23 and 24. It is noted that the data generator 40 and 41 correspond to specific data selecting means.

The SELs 42 and 43 preferentially transmit data containing the specific sequence or specific code transmitted from the data generator sections 40 and 41 to the data identifying Flag inserting sections 19 and 20. This will be explained concretely by the example described above. When the SELs 42 and 43 receive data conforming to the standard ITU-T G984 from the data generator sections 40 and 41, they transmit the data preferentially to the data identifying Flag inserting sections 19 and 20 and when they receive the specific data into which the code number (e.g., 03) is added from the data generator sections 40 and 41, they preferentially transmit the data to the data identifying Flag inserting sections 19 and 20 in the same manner. It is noted that the SELs 42 and 43 correspond to specific data selecting means.

The test delay buffers A 44 and 45 temporarily hold the testing data on which the test has been implemented by the test configuring sections 23 and 24. This will be explained concretely by the example described above. When the data identifying Flag inserting sections 19 and 20 receive the specific data into which the code number (e.g., 03) is added from the data generator sections 40 and 41, they output the data as testing data to the test configuring sections 23 and 24. Then, the test configuring sections 23 and 24 extract a test number from the testing data, obtain a testing item corresponding to the test number to implement it, calculate time (TTTD) when the test ends and output the data to the test delay buffers A 44 and 45. The test delay buffers A 44 and 45 hold the inputted data until when they receive an instruction of the data reading section 32 described later.

After calculating a test implementing longest time that is a longest processing time when the test is implemented from the time obtained by the test configuring sections 23 and 24 and the time obtained by the data generator sections 40 and 41, the data reading section 32 of the control section 30 extracts a differential time between the test implementing longest time and the time calculated by the test configuring sections 23 and 24 when the data identifying Flag inserting sections 19 and 20 receive the data and the test configuring sections 23 and 24 implement the test, reads the data transmitted to the test delay buffers A 44 and 45 after an elapse of the differential time and reads the data transmitted to the delay buffers A 25 and 26 from the data identifying Flag inserting sections 19 and 20 when the data identifying Flag inserting sections 19 and 20 receive the data and the data is transmitted to the delay buffers A 25 and 26.

This will be explained concretely by the example described above. The data reading section 32 calculates the test implementing longest time (TTMAX=TTTD−TOD) that is the longest processing time when a test is implemented from the time (TTOD) obtained by the test configuring sections 23 and 24 and the time (TOD) obtained by the data generator sections 40 and 41. After that, when the data identifying Flag inserting sections 19 and 20 receive the data and the test configuring sections 23 and 24 implement the test, the data reading section 32 extracts the differential time (ΔTTCH) between the test implementing longest time (TTMAX) and the time (TTTD2) calculated by the test configuring sections 23 and 24. Then, the data reading section 32 reads the data transmitted to the test delay buffers A 44 and 45 after an elapse of the differential time (ΔTTCH) from the receiving time.

Furthermore, when the data identifying Flag inserting sections 19 and 20 receive data and the data is transmitted to the delay buffers A 25 and 26, the data reading section 32 reads the data transmitted from the data identifying Flag inserting sections 19 and 20 to the delay buffers A 25 and 26 after an elapse of the test implementing longest time (TTMAX) from the receiving time.

Effects of Second Embodiment

Thus, according to the second embodiment, it is possible to readily verify the specific sequence and data because the testing apparatus transmits the data containing the specific sequence or specific code to the OLT, ONU or ONT and preferentially transmits the data containing the transmitted specific sequence or specific code.

For example, the testing apparatus transmits the specific sequence such as OAM (Operations Administration and Maintenance) and OMCI (ONU Management Control Interface) described in the ITU-T G984 and specific data such as—code in PLOAM (Physical Layer OAM) and tests the events within the network. As a result, it is possible to test whether or not the event violates the standard (e.g., a respond code string and a response time). It is also possible to readily verify the specific sequence and data by holding test results to those data.

Furthermore, according to the second embodiment, it is possible to test the events occurring within the network during normal communications without depending on the testing item as a result that it is possible to adjust the communication delay caused by the test always uniformly because the network testing apparatus transmits specific data into which a code number of a testing item which takes a longest processing time in the test implemented by temporarily holding the testing data on which the test has been implemented is added and obtains the specific data transmitting time, outputs the specific data as the testing data to the test configuring sections 23 and 24 when it receives the specific data, extracts a code number from the generated testing data, implements a testing item by obtaining the testing item corresponding to the code number, obtains testing item finishing time, calculates a test implementing longest time that is a longest processing time when the test is implemented from the time obtained by the test configuring sections 23 and 24 and the time obtained by the data generator sections 40 and 41 and then extracts a differential time between the test implementing longest time and the time calculated by the test configuring sections 23 and 24 when the data identifying Flag inserting sections 19 and 20 receive the data and the test configuring sections 23 and 24 implement the test, reads the data transmitted to the test delay buffers A 44 and 45 after an elapse of the differential time and reads the data transmitted to the delay buffers A 25 and 26 by the data identifying Flag inserting sections 19 and 20 after an elapse of the test implementing longest time when the data identifying Flag inserting sections 19 and 20 receive the data and the data is transmitted to the data buffer A 25 and 26.

In a case when the network testing apparatus calculates a test implementing longest time (two minutes) in advance and when it receives data and implements a test after that for example, it calculates a differential time (one minute) between the test implementing longest time (two minutes) and the time (one minute) required for the test and reads the data after an elapse of the differential time (one minute) after finishing the test. Furthermore, when the network testing apparatus receives data and then implements a test, it calculates a differential time (30 seconds) between a test implementing longest time (two minutes) and a time (30 seconds) required for the test and reads the data after an elapse of the differential time (30 seconds) after finishing the test. When no test is implemented on received data, the network testing apparatus reads the data after an elapse of a test implementing longest time (two minutes) after receiving the data. Thus, the network testing apparatus reads the data after the elapse of the test implementing longest time (two minutes) after receiving the data even if any test is implemented after receiving the data. As a result, a communication delay due to a test may be adjusted always uniformly. Then, it is possible to test the events occurring within the network during normal communications without depending on the testing item.

Third Embodiment

While the case of transmitting data without considering a communication delay within the connected ONU in the first and second embodiments, the invention is not limited to such cases and may be arranged so as to transmit data by considering the communication delay within the connected ONU.

Then, the case of transmitting data by considering the communication delay within the connected ONU will be explained by using FIG. 7. It is noted that the configuration of the G-PON network testing apparatus of the third embodiment and effects of the third embodiment will be explained in the third embodiment.

The configuration of the G-PON network testing apparatus of the third embodiment will be explained by using FIG. 7. FIG. 7 is a block diagram showing the configuration of the G-PON network testing apparatus of the third embodiment.

Figure 7:
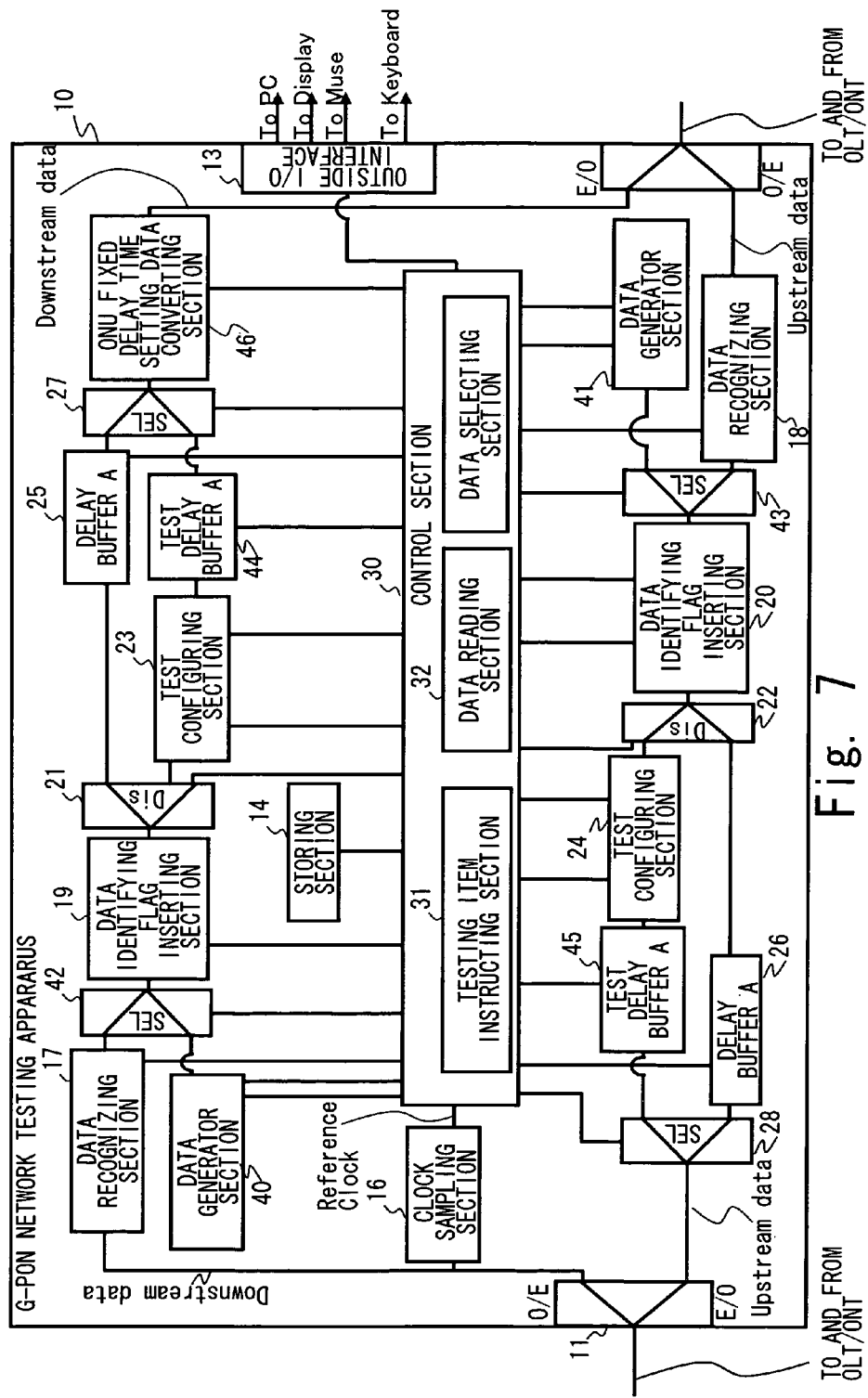
FIG. 7 shows a schematic block diagram showing the configuration of the G-PON network testing apparatus according to still another embodiment.

As shown in FIG. 7, the G-PON network testing apparatus 10 has the communication control I/F sections 11 and 12, the outside IO interface 13, the storing section 14, the clock sampling section 16, the data recognizing sections 17 and 18, the data identifying Flag inserting sections 19 and 20, the Dises 21 and 22, the test configuring sections 23 and 24, the delay buffers A 25 and 26, the SELs 27 and 28, the control section 30, the data generator sections 40 and 41, the SELs 42 and 43, the Test delay buffers A 44 and 45 and an ONU fixed delay time setting data converting section 46.

Among them, the communication control I/F sections 11 and 12, the outside IO interface 13, the storing section 14, the clock sampling section 16, the data recognizing sections 17 and 18, the data identifying Flag inserting sections 19 and 20, the Dises 21 and 22, the test configuring sections 23 and 24, the delay buffers A25 and 26, the SELs 27 and 28, the control section 30, the data generator sections 40 and 41, the SELs 42 and 43 and the Test delay buffers A 44 and 45 have the same functions with those explained in the first and second embodiments, so that their detailed explanation will be omitted here. Here, and the ONU fixed delay time setting data converting section 46 having different functions with those in the first and second embodiments will be explained.

When the ONU fixed delay time setting data converting section 46 receives a response to data read by the data reading section 32 of the control section 30 and transmitted to the ONU from the ONU, it measures a communication delay time within the ONU from time when the data has been transmitted and time when the response has been received and transmits the data read by the data reading section 32 to the ONU by adjusting the communication delay time. Specifically, the ONU fixed delay time setting data converting section 46 detects such that the response to the data read by the data reading section 32 of the control section 30 and transmitted to the ONU delays by one second each every time. In such a case, the ONU fixed delay time setting data converting section 46 adjusts so as to eliminate the communication delay occurring within the connected ONU by quickening timing for transmitting the data to the ONU for example. The timing for adjusting the communication delay may be implemented periodically, not only when the delay of response is detected. The ONU fixed delay time setting data converting section 46 corresponds to ONU delay time adjusting means.

Thus, according to the third embodiment, it is possible to test more accurately as a result that the communication delay occurring within the connected ONU can be adjusted because the network testing apparatus measures the communication delay time within the ONU from the data transmitted time and response received time when it receives, from the ONU, the response to the data read by the data reading section 32 and transmitted to the ONU and transmits the data read by the data reading section 32 to the ONU by adjusting the communication delay time.

For example, when the response from the ONU delays by one second each every time, there is a possibility that the data transmitted by the ONU collide from each other when the ONU continues to transmit the response. Therefore, when the testing apparatus detects that the response delays one second each, the testing apparatus can adjust the communication delay occurring within the connected ONU by quickening the timing for transmitting the data to the ONU. As a result, it becomes possible to test more accurately.

Fourth Embodiment

By the way, while the embodiments of the invention have been explained above, the invention may be carried out in various different modes beside the embodiments described above. Then, a different embodiment will be explained by dividing as (1) Verification of Test Result, (2) Effective Utilization of Test Data, (3) Exemplary Network Configuration, (4) System Configuration and Others and (5) Programs as described below.

(1) Verification of Test Result:

Although no explanation on a test result verifying method has been made in the first through third embodiments, it is possible to arrange so as to verify test results by using the control section, the test configuring section and the test delay buffer shown in FIGS. 6 and 7.

Figure 8:
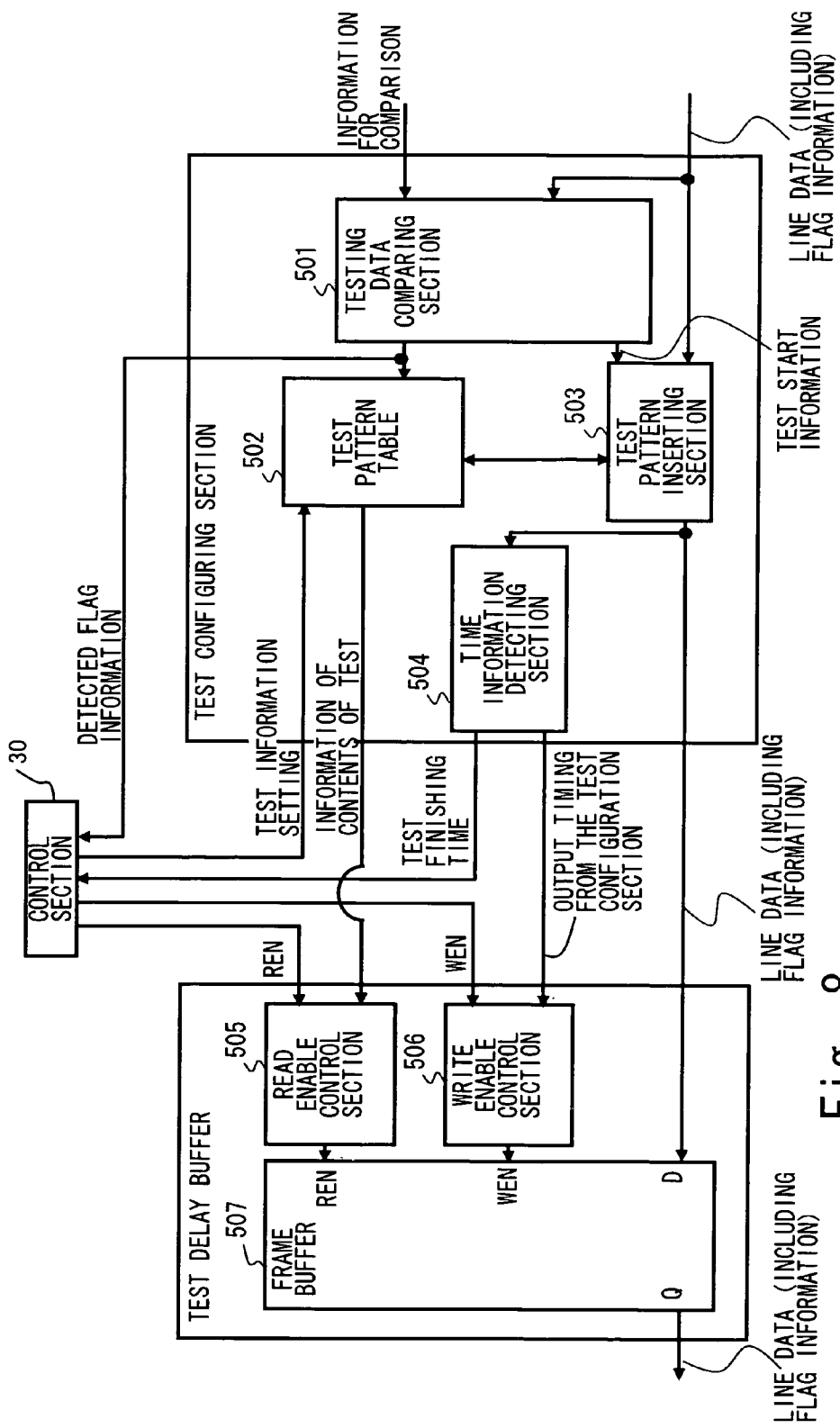
FIG. 8 shows a schematic diagram showing a method for verifying a test result.

This will be explained concretely by using FIG. 8. A testing data comparing section of the test configuring section that receives data receives test results before receiving the data stored in the storing section via the control section. Then, the testing data comparing section outputs test start information to a test pattern inserting section and transmits Flag information (code number) and comparison results to the control section. Furthermore, a time information detecting section outputs test finishing time to the control section.

Then, the test pattern inserting section that has received the test start information obtains contents of test from a test pattern table to implement a test of the received data, outputs its result to the test pattern inserting section and outputs the data to the test delay buffer and outputs the test finishing time to the time information detecting section. Then, the control section obtains the test result from the test pattern table and the time information detecting section outputs the test finishing time to the control section.

Then, the test delay buffer reads the received data corresponding to contents of instruction instructed from a write enable control section. Information on the compared received data (e.g., received data, contents of test, test result, test time, comparison result and others) is transmitted to the control section and is stored in the storing section and others. Then, it is possible to use the information on the received data thus stored for verifying processes.

(2) Effective Utilization of Test Data:

It is possible to arrange so as to generate testing data from real data and to utilize the testing data by returning to real data after finishing a test also in real operation. Specifically, when the code number is added to the data read from the buffer, the network testing apparatus transmits the data to the OLT, ONU or ONT by removing the code number from the data. It is possible to effectively use the data flowing within the network by arranging as described above.

When a test is implemented during real operation for example, the network testing apparatus generates testing data by adding a code number from real data transmitted in the G-PON system, implements and verifies the test by using the testing data and generates the original data by removing the code number from the testing data after finishing the test. As a result, it becomes possible to effectively utilize the data flowing in the network without separately preparing the testing data.

Still more, it allows burdens of the network, lines and system to be reduced. Specifically, when a test is implemented by preparing testing data during real operation, real data and the testing data flow on the network, increasing the burdens of the network and lines. The testing apparatus also receives the real data and the testing data, so that the burden of the system increases. Then, it becomes possible to reduce such burdens by effectively utilizing the data flowing on the network as described above.

Figure 9:
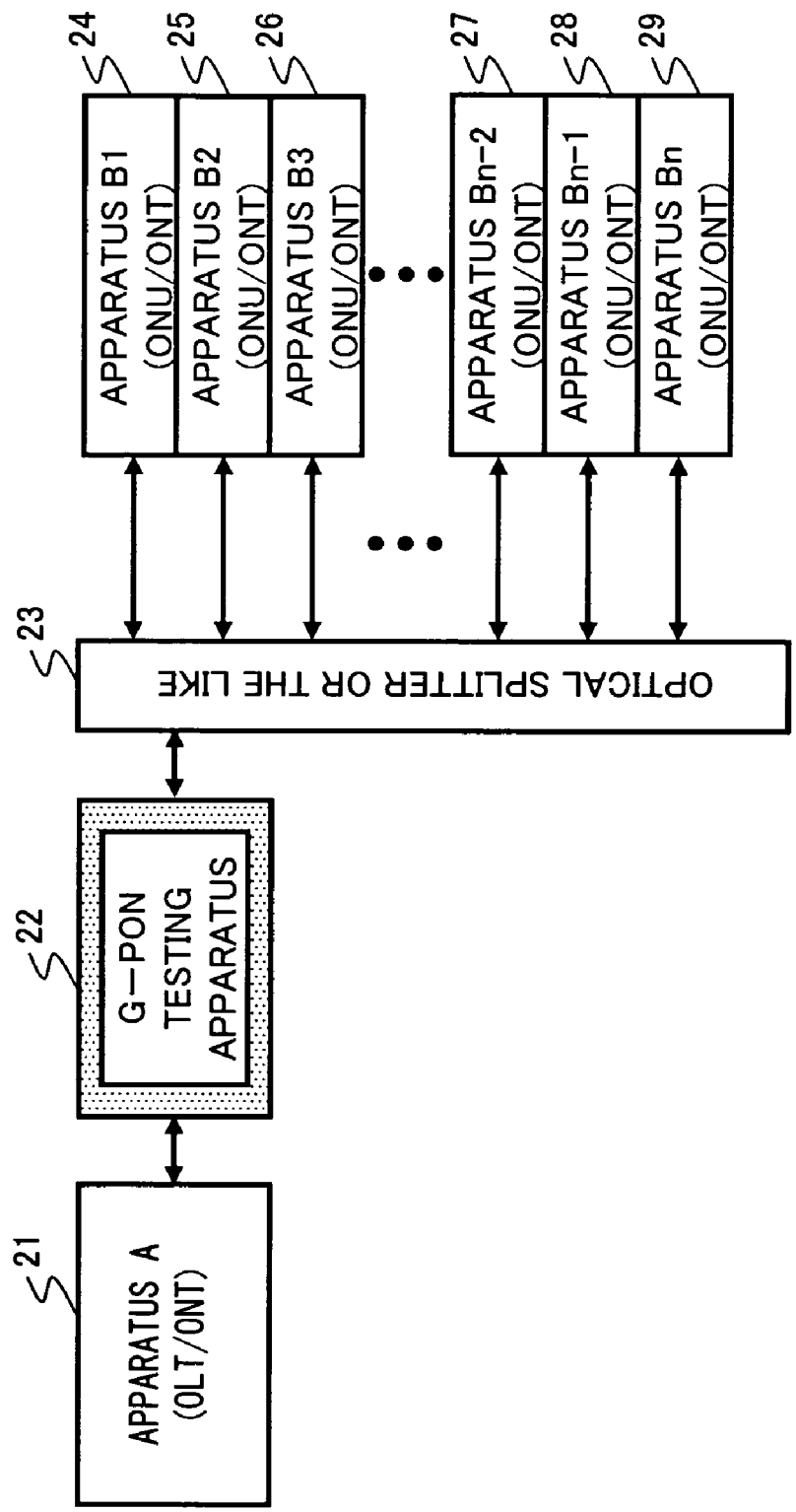
FIG. 9 shows a schematic diagram showing an exemplary mode in which the G-PON network testing apparatus is connected.
Figure 10:
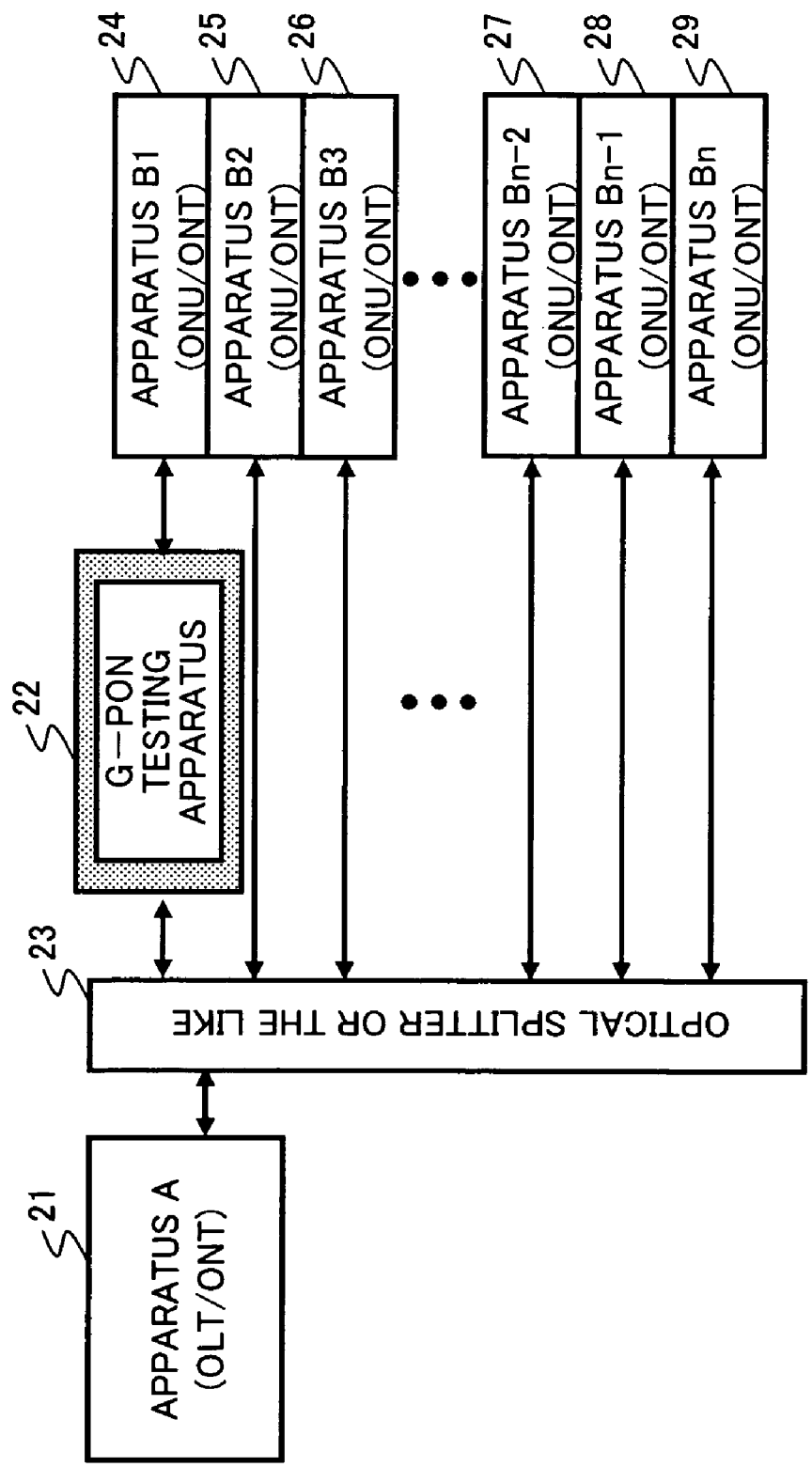
FIG. 10 shows a schematic diagram showing an exemplary mode in which the G-PON network testing apparatus is connected.
Figure 11:
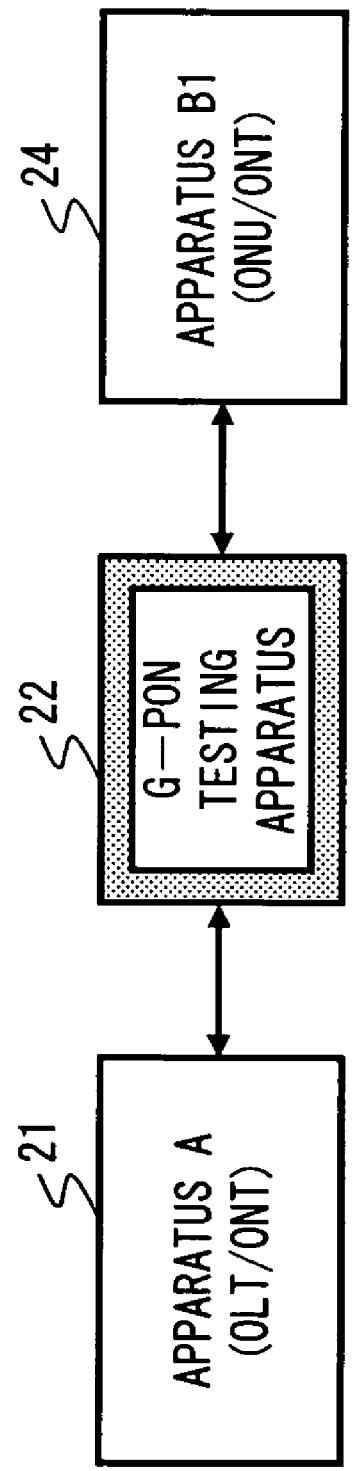
FIG. 11 shows a schematic diagram showing an exemplary mode in which the G-PON network testing apparatus is connected.

(3) Exemplary Network Configuration:

While the case in which the G-PON network testing apparatus explained in the first through third embodiments is installed between the OLT or ONT and ONU or ONT, the invention is not limited to that and may be connected in various modes. For example, it may be connected between an apparatus A (OLT/ONT) and an optical splitter to which various apparatuses B1 through Bn (ONU/ONT) are connected as shown in FIG. 9, between the optical splitter and the plurality of apparatuses various apparatuses B1 through Bn (ONU/ONT) as shown in FIG. 10 or between one apparatus A (OLT/ONT) and one apparatus B1 (ONT) as shown in FIG. 11. It is noted that FIGS. 9 through 11 are diagrams showing exemplary modes in which the G-PON network testing apparatus is connected.

(4) System Configuration and Others:

Furthermore, each component of each device shown in the figures are functional and conceptual and are not required to be physically constructed always as shown in the figures. That is, the concrete modes of distribution and integration of the respective devices are not limited to what are shown in the figures and the whole or part thereof may be arranged by physically distributing or integrating (e.g., integration of the data recognizing section and the data identifying Flag inserting section) in an arbitrary unit corresponding to various loads, use conditions and others. Still more, a whole or any part of each processing function performed by each device is realized by a CPU and a program analyzed and executed by the CPU or is realized as hardware by wired logic.

A whole or part of process (e.g., a testing process corresponding to a testing item) explained as what is automatically carried out among the respective processes explained in the embodiment may be carried out manually and a whole or part of process (e.g., instruction of testing item) explained as what is manually carried out may be carried out automatically by publicly known methods. Beside that, information (e.g., FIG. 3) containing the processing procedures, control procedures, specific names, various data and parameters described in the text and figures described above may be arbitrarily changed except of cases specifically described.

(5) Program:

By the way, the various processes explained in the embodiments described above may be realized by executing a program prepared in advance by a computer system such as a personal computer, workstation and others. Then, a computer system executing a program having the same functions with the embodiments described above will be explained below as another embodiment.

Figure 12:
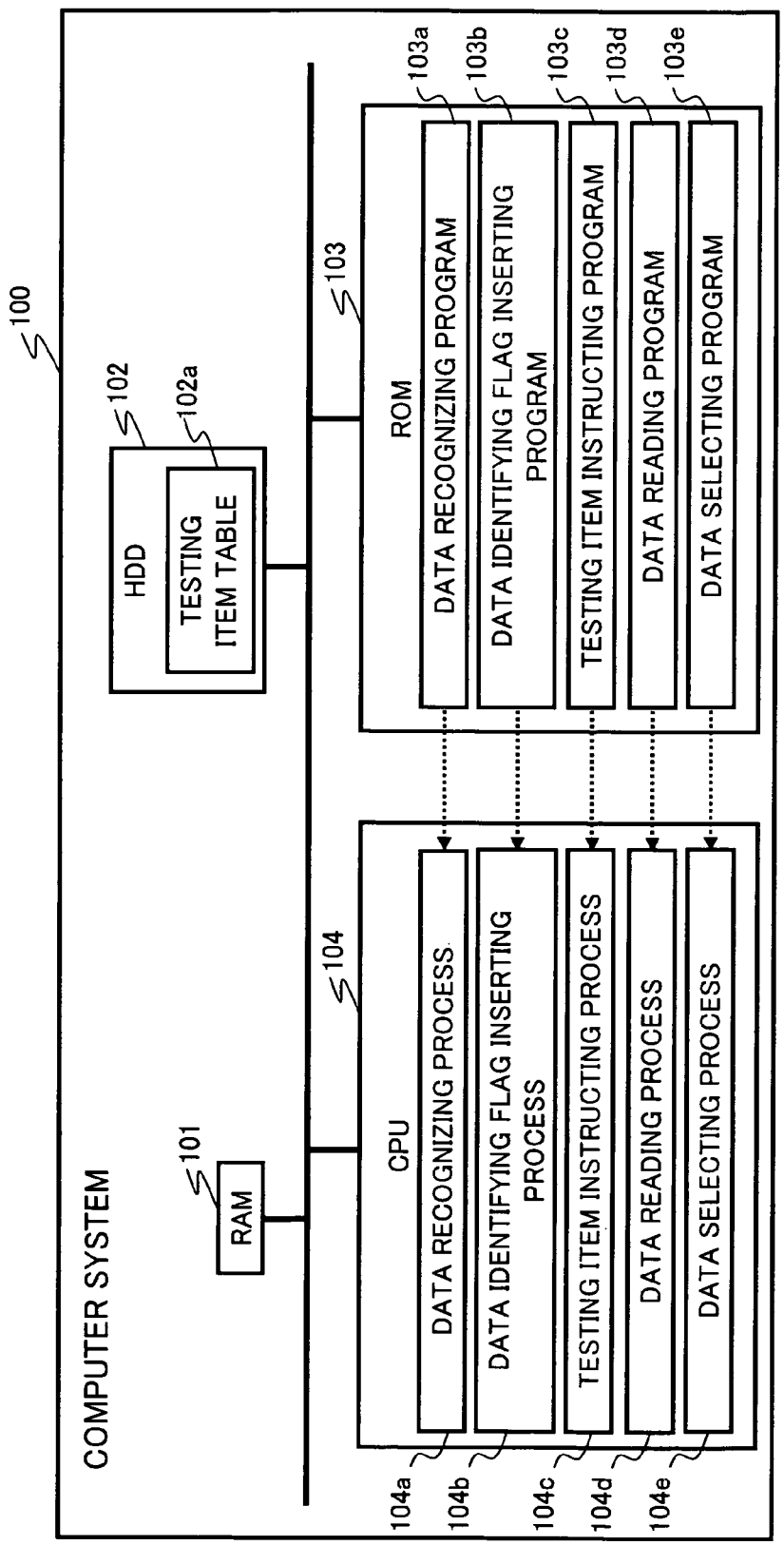
FIG. 12 shows a schematic diagram showing an exemplary computer system executing a network testing program.
Figure 13:
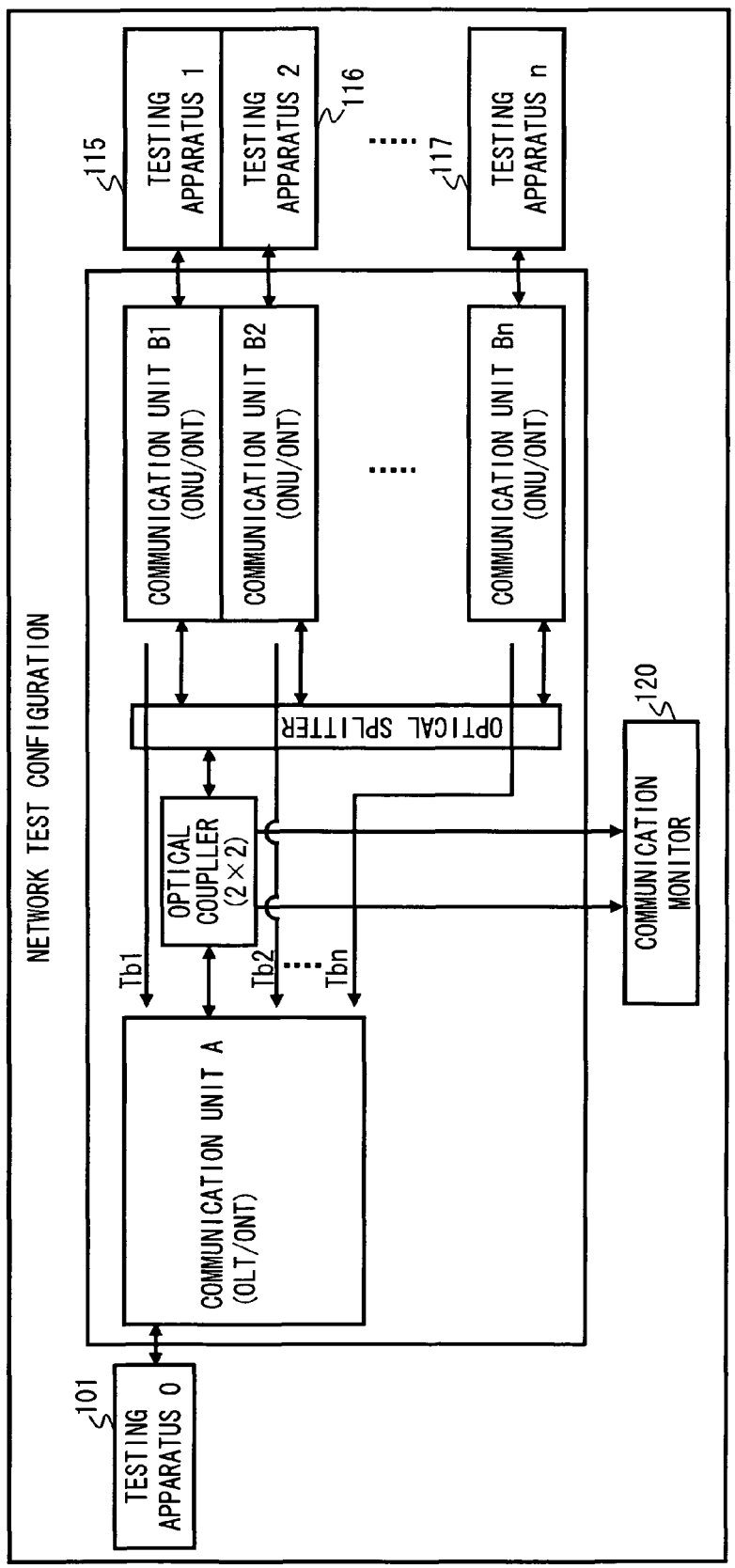
FIG. 13 shows a diagram explaining a prior art.

FIG. 12 is a diagram showing an exemplary computer system executing a network testing program. As shown in FIG. 12, the computer system 100 is composed of a RAM 101, a HDD 102, a ROM 103 and a CPU 104. Here, programs that exhibit the same functions with those in the embodiments described above, i.e., a data recognizing program 103a, a data Flag inserting program 103b, a testing item instructing program 103c, a data reading program 103d and a data selecting program 103e, are stored in the ROM 103 in advance as shown in FIG. 12.

Then, the CPU 104 realizes a data recognizing process 104a, a data Flag inserting process 104b, a testing item instructing process 104c, a data reading process 104d and a data selecting process 104e by reading and executing these programs 103a through 103e as shown in FIG. 12. It is noted that the data recognizing process 104a corresponds to the data recognizing sections 17 and 18 shown in FIG. 2, the data Flag inserting process 104b corresponds to the data identifying Flag inserting sections 19 and 20, the testing item instructing process 104c corresponding to the testing item instructing section 31, the data reading process 104d corresponds to the data reading section 32 and the data selecting process 104e corresponds to the data selecting section 33 in the same manner.

The HDD 102 is also provided with a testing item table 102a for storing testing items related to events occurring within a network and code numbers identifying the testing items by correlating them from each other. It is noted that the testing item table 102a corresponds to the testing item DB 15 shown in FIG. 2.

By the way, the programs 103a through 103e need not be always stored in the ROM 103. For example, it is possible to arrange so as to store them in a fixed physical medium such as a hard disk drive (HDD) provided in or outside of the computer system 100 and in another computer system connected to the computer system 100 via a public data network, Internet, LAN and WAN beside a portable physical medium such as a flexible disk (FD), CD-ROM, MO disk, DVD disk, optical magnetic disk and IC card inserted into the computer system 100 and so that the computer system 100 reads and executes the programs from them.

The embodiments, for example shown in FIGS. 1, 2, 6, 7, show the configurations that include the sections or means for processing both up- and down streams data. However, it is possible to provide an apparatus which comprises sections or means for processing one of up- or down-stream data by the description above.

As described above, the network testing apparatus, network testing method and network testing program of the invention are useful in testing events occurring within a network constructed between the OLT or ONT and an ONU or ONT by connecting said OLT or ONT and the ONU or ONT by one optical fiber and are specifically suitable for testing the events occurring within the network during normal communications without requiring an enormous amount of time.

According to aspect of the present invention, it is possible to test the events occurring within the network during normal communications without requiring an enormous amount of time because the network testing apparatus, network testing method or network testing program stores testing items related to the events occurring within the network and code numbers for identifying the testing items by correlating them from each other, receives data from the OLT, ONU or ONT and obtains receiving time of the data and transmits the data to a predetermined data buffer when no test is implemented or generates testing data in which a code number indicating a testing item is added to the data when a test is implemented, extracts the code number from the generated testing data, obtains the testing item corresponding to the code number to implement the testing item and obtains time when the testing item has been finished and calculates a test time required for implementing the test from the obtained data receiving time and the test finishing time and reads the data transmitted to the predetermined data buffer after an elapse of the calculated test time.

For example, it is possible to test such events as delayed insertion of input data, fluctuation (jitter) of data arrival time, fall of part or all transmission data and reversal of sequence of data during when the ONU or ONT normally transmits data with the assigned timing (time-divided) and to implement the test in a short time without requiring to obtain and analyze data flowing within the network.

Furthermore, it is possible to reduce a cost for constructing a G-PON system or the like as a result of having a line for implementing a test and a line for transmitting data without implementing any test by having the testing apparatus within the network and to unify a communication time when the test is implemented and no test is implemented as a result that it is possible to adjust an error (communication delay time) of transmission time that occurs when the test is implemented.

According to another aspect of the present invention, it is possible to readily verify a specific sequence or data because the network testing apparatus transmits data containing the specific sequence or specific code to the OLT, ONU or ONT and preferentially transmits the data containing the transmitted specific sequence or the specific code.

For example, as a result that the network testing apparatus can test the events within the network by transmitting specific sequence such as OAM (Operations Administration and Maintenance) and OMCI (ONU Management Control Interface) described in the ITU-T G984 and specific data such as code in PLOAM (Physical Layer OAM), it is possible to test whether or not the event violates the standard (e.g., a respond code string and a response time). It is also possible to readily verify the specific sequence and data by holding test results to those data.

According to still another aspect of the present invention, it is possible to test the events occurring within the network during normal communications without depending on the testing item as a result that it is possible to adjust the communication delay caused by the test always uniformly because the network testing apparatus transmits specific data into which a code number of a testing item which takes a longest processing time in the test implemented by temporarily holding the testing data on which the test has been implemented is added and obtains the specific data transmitting time, outputs the specific data as the testing data when it receives the specific data, extracts a code number from the generated testing data, implements the testing item by obtaining the testing item corresponding to the code number, obtains testing item finishing time, calculates a test implementing longest time that is a longest processing time when the test is implemented from the obtained data receiving time and the testing item finishing time and then extracts a differential time between the test implementing longest time and the calculated time when it receives the data and implements the test, reads the transmitted data after an elapse of the differential time and reads the data transmitted to the predetermined buffer after an elapse of the test implementing longest time when the data is transmitted to the predetermine data buffer.

In a case when the network testing apparatus calculates a test implementing longest time (two minutes) in advance and when it receives data and implements a test after that for example, it calculates a differential time (one minute) between the test implementing longest time (two minutes) and the time (one minute) required for the test and reads the data after an elapse of the differential time (one minute) after finishing the test. Furthermore, when the network testing apparatus receives data and then implements a test, it calculates a differential time (30 seconds) between a test implementing longest time (two minutes) and a time (30 seconds) required for the test and reads the data after an elapse of the differential time (30 seconds) after finishing the test. When no test is implemented on received data, the network testing apparatus reads the data after an elapse of a test implementing longest time (two minutes) after receiving the data. Thus, the network testing apparatus reads the data after the elapse of the test implementing longest time (two minutes) after receiving the data even if any test is implemented after receiving the data. As a result, a communication delay due to a test may be adjusted always uniformly. Then, it is possible to test the events occurring within the network during normal communications without depending on the testing item.

According to yet another aspect of the present invention, it is possible to test more accurately as a result that the communication delay occurring within the connected ONU can be adjusted because the network testing apparatus measures the communication delay time within the ONU from the data transmitted time and response received time when it receives, from the ONU, a response to the data read and transmitted to the ONU and transmits the data to the ONU by adjusting said communication delay time.

When the response from the ONU delays by one second each every time and the ONU continues to transmits the response as it is for example, there is a possibility that the data transmitted by the ONU collide each other. Therefore, when the network testing apparatus detects that the response delays by one second each, it adjusts the communication delay occurring within the connected ONU by quickening the timing for transmitting the data to the ONU. As a result, it becomes possible to test more accurately.

According to yet a further aspect of the present invention, it is possible to effectively use the data flowing within the network because the network testing apparatus transmits the data to the OLT, ONU or ONT by removing the code number from the data when the code number is added to the read data.

When a test is implemented during real operation for example, the network testing apparatus generates testing data by adding a code number from real data transmitted in the G-PON system, implements and verifies the test by using the testing data and generates the original data by removing the code number from the testing data after finishing the test. As a result, it becomes possible to effectively utilize the data flowing in the network without separately preparing the testing data.

Still more, it allows burdens of the network, lines and system to be reduced. Specifically, when a test is implemented by preparing testing data during real operation, real data and the testing data flow on the network, increasing the burdens of the network and lines. The testing apparatus also receives the real data and the testing data, so that the burden of the system increases. Then, it becomes possible to reduce such burdens by effectively utilizing the data flowing on the network as described above.

According to still another aspect of the present invention, it is possible to reliably split the data on which no test is implemented and the data on which a test is implemented because the network testing apparatus splits the transmitted data and testing data by the predetermined data buffer or the test implementing means.

For example, the provision of the split circuit can assure a communication path and minimizes a risk of erroneously splitting the data on which no test is implemented and the data on which a test is implemented. As a result, they may be reliably split.

What is clamed is:

1. A network testing apparatus for testing data transmitted between optical transmission devices, the apparatus comprising;
   a receiver for receiving data transmitted from one of the optical transmission devices to an other, the receiver being capable of acquiring information of a time of receiving the data;
   a selector for selecting a set of data to be tested out of the data received by the receiver;
   a tester for testing the set of data according to a predetermined test item, the tester being capable of acquiring information of a termination time of testing the set of data;
   a calculator for calculating a time interval between the time of the set of data received by the receiver and the time of termination of testing the set of data performed by the tester on the basis of the information of the time of receiving the data and of the termination time;
   a buffer for storing a next set of data corresponding to data received next to the set of data by the receiver; and
   a transmitter for transmitting the next set of data stored in the buffer after the time interval from a time when the next set of data is stored in the buffer.

2. The network testing apparatus according to claim 1, wherein the network testing apparatus tests a signal corresponding to an optical signal transmitted between an optical line or network terminal and an optical network unit or termination.

3. A network testing apparatus for testing events occurring within a network, the network testing apparatus being placed between either an optical line terminal (OLT) or an optical network termination (ONT) and either an optical network unit (ONU) or an optical network termination, the network being composed by connecting either said OLT or ONT to either said ONU or ONT by one optical fiber, the network testing apparatus comprising:
   testing item storing means for storing testing items related to the events occurring within said network and code numbers for identifying said testing items and differentiating them from each other;
   testing data generating means for receiving data from said OLT, ONU or ONT, obtaining receiving time of the data and transmitting the data to a predetermined data buffer when no test is implemented, or generating testing data in which a code number indicating a testing item is added to the data when a test is implemented;
   test implementing means for extracting the code number from the testing data generated by said testing data generating means, obtaining the testing item corresponding to the code number from said testing item storing means to implement the testing item and obtaining time when the testing item has been finished; and
   data reading means for calculating a test time required for implementing said testing item from the time obtained by said testing data generating means and the time obtained by said test implementing means and for reading data that is transmitted to the predetermined data buffer by said testing data generating means after an elapse of said calculated test time.

4. The network testing apparatus according to claim 3, further comprising:
   specific data transmitting means for transmitting data containing a specific sequence or specific code to said OLT, ONU or ONT; and
   specific data selecting means for transmitting the data containing the specific sequence or the specific code transmitted from said specific data transmitting means to said testing data generating means before transmitting the data which does not contain the specific sequence of the specific code.

5. The network testing apparatus according to claim 4, further comprising:
   testing data holding means for temporarily holding the testing data on which the test has been implemented by said test implementing means, wherein
   said specific data transmitting means transmits specific data into which a code number of a testing item which takes a longest processing time in the test implemented by said test implementing means is added and obtains time when the specific data has been transmitted;
   said testing data generating means outputs said specific data as said testing data to said test implementing means when it receives the specific data from said specific data transmitting means;
   said data reading means calculates a test implementing longest time that is a longest processing time when said test is implemented from the time obtained by said test implementing means and the time obtained by said specific data transmitting means, and then
   said data reading means extracts a differential time between the test implementing longest time and the time obtained by said test implementing means and reads the data transmitted to said testing data holding means after an elapse of said differential time when said test data generating means receives the data and the test implementing means implements the testing item or reads the data transmitted to the predetermined buffer by said testing data generating means after an elapse of said test implementing longest time when said testing data generating means receives data that is transmitted to the predetermine data buffer.

6. The network testing apparatus according to claim 3, further comprising:
ONU delay time adjusting means for measuring a communication delay time within the ONU and for transmitting the data read by said data reading means to the ONU by adjusting the communication delay time, the communication delay time being measured from data transmitted time at which the data is transmitted to the ONU and a response received time when a response to the data is received from the ONU.

7. The network testing apparatus according to claim 3, further comprising:
code number deleting means for transmitting the data read from said data reading means to said OLT, ONU or ONT by removing said code number from the data when said code number is added to the data.

8. The network testing apparatus according to claim 3, further comprising:
splitting means for splitting the data and testing data transmitted by said testing data generating means respectively to said predetermined data buffer or to said test implementing means.

9. A network testing method for testing events occurring within a network, the network being composed optical transmission devices connected by an optical fiber, the network testing method comprising:
storing testing items related to events occurring within the network and code numbers for identifying the testing items by differentiating them from each other;
receiving a data corresponding to a signal transmitted between the optical transmission devices and acquiring a receiving time of reception of the data;
generating a generating test data, the test data comprising a code number indicating a testing item in addition to the data in case that a test for the data is implemented;
transmitting the data to a predetermined data buffer in case that the test for the data is not implemented;
processing the test for the data according to the code number from the testing data and obtaining time when the testing item has been finished;
calculating a test time required for implementing the test on the basis of the receiving time and the time to when the testing item has been finished; and
reading the data transmitted to the predetermined data buffer after an elapse of said calculated test time.

10. A computer program product comprising a non-transitory computer readable medium having computer program logic recorded thereon for controlling a processor in a network testing apparatus, the computer program logic comprising:
storing testing items related to events occurring within the network and code numbers for identifying the testing items by correlating them from each other;
receiving a data corresponding to a signal transmitted between the optical transmission devices and acquiring a receiving time of reception of the data;
generating a generating test data, the test data comprising a code number indicating a testing item in addition to the data in a case that a test for the data is implemented;
transmitting the data to a predetermined data buffer in a case that the test for the data is not implemented;
processing the test for the data according to the code number from the testing data and obtaining time when the testing item has been finished;
calculating a test time required for implementing the test on the basis of the receiving time and the time to when the testing item has been finished; and
reading the data transmitted to the predetermined data buffer after an elapse of said calculated test time.

* * * * *